United States Patent
Seo et al.

(10) Patent No.: US 9,068,893 B2
(45) Date of Patent: Jun. 30, 2015

(54) SPECTRAL CHARACTERISTIC OBTAINING APPARATUS, IMAGE EVALUATION APPARATUS AND IMAGE FORMING APPARATUS

(75) Inventors: Manabu Seo, Kanagawa (JP); Naohiro Kamijo, Kanagawa (JP); Kohei Shimbo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 662 days.

(21) Appl. No.: 13/138,428

(22) PCT Filed: Mar. 24, 2010

(86) PCT No.: PCT/JP2010/055781
§ 371 (c)(1),
(2), (4) Date: Aug. 12, 2011

(87) PCT Pub. No.: WO2010/113987
PCT Pub. Date: Oct. 7, 2010

(65) Prior Publication Data
US 2011/0299104 A1     Dec. 8, 2011

(30) Foreign Application Priority Data

Mar. 30, 2009 (JP) ................................ 2009 081986
Nov. 13, 2009 (JP) ................................ 2009 260259

(51) Int. Cl.
*G01J 3/28* (2006.01)
*G01J 3/51* (2006.01)
(Continued)

(52) U.S. Cl.
CPC .... *G01J 3/51* (2013.01); *G01J 3/02* (2013.01); *G01J 3/0205* (2013.01); *G01J 3/0208* (2013.01);
(Continued)

(58) Field of Classification Search
CPC ............. G01J 3/0278; G01J 3/46; G01J 3/02; G01J 3/50

USPC .......... 250/226; 356/328, 305, 326, 400–421
See application file for complete search history.

(56) References Cited

U.S. PATENT DOCUMENTS 4,672,433 A    6/1987  Yamamoto et al.
5,037,201 A *  8/1991  Smith et al. ................... 356/326
(Continued)

FOREIGN PATENT DOCUMENTS

EP        642005 A1    3/1995
JP     60-230290 A    11/1985
(Continued)

OTHER PUBLICATIONS

Extended Search Report for European Application No. 10758758.6 dated Feb. 26, 2014.

*Primary Examiner* — Kara E Geisel
*Assistant Examiner* — Maurice Smith
(74) *Attorney, Agent, or Firm* — Harness, Dickey & Pierce

(57) ABSTRACT

A spectral characteristic obtaining apparatus including a light irradiation unit configured to emit light onto a reading object; a spectroscopic unit configured to separate at least a part of diffused reflected light from the light emitted onto the reading object by the light irradiation unit into a spectrum; and a light receiving unit configured to receive the diffused reflected light separated into the spectrum by the spectroscopic unit and to obtain a spectral characteristic. In at least one example embodiment, the light receiving unit is configured to be a spectroscopic sensor array including plural spectroscopic sensors arranged in a direction, and the spectroscopic sensors include a predetermined number of pixels arranged in the direction to receive lights with different spectral characteristics from each other.

11 Claims, 34 Drawing Sheets

(51) Int. Cl.
  *G01J 3/02* (2006.01)
  *G01J 3/04* (2006.01)
  *G01J 3/26* (2006.01)
  *H04N 9/04* (2006.01)

(52) U.S. Cl.
  CPC ............ *G01J 3/0216* (2013.01); *G01J 3/0229* (2013.01); *G01J 3/04* (2013.01); *G01J 3/26* (2013.01); *G01J 3/2803* (2013.01); *G01J 3/2823* (2013.01); *G01J 3/513* (2013.01); *H04N 9/045* (2013.01)

(56) References Cited

U.S. PATENT DOCUMENTS

| | | | |
|---|---|---|---|
| 5,497,269 A * | 3/1996 | Gal | 359/615 |
| 5,724,437 A | 3/1998 | Bucher et al. | |
| 5,933,520 A | 8/1999 | Ishimoto et al. | |
| 6,226,083 B1 * | 5/2001 | Schwerzel et al. | 356/305 |
| 6,603,574 B1 * | 8/2003 | Ramirez et al. | 358/1.9 |
| 6,845,910 B2 * | 1/2005 | Gu et al. | 235/454 |
| 7,420,736 B2 * | 9/2008 | Biel | 359/570 |
| 7,443,508 B1 * | 10/2008 | Vrhel et al. | 356/446 |
| 7,471,391 B2 * | 12/2008 | Imura | 356/326 |
| 8,081,244 B2 * | 12/2011 | Golub et al. | 348/294 |
| 8,472,019 B2 * | 6/2013 | Seo et al. | 356/328 |
| 2003/0058447 A1 | 3/2003 | Yamada et al. | |
| 2004/0257563 A1 * | 12/2004 | Miller et al. | 356/328 |
| 2005/0240366 A1 | 10/2005 | Mestha et al. | |
| 2006/0044429 A1 | 3/2006 | Toda et al. | |
| 2006/0192963 A1 | 8/2006 | Frick | |
| 2007/0091197 A1 * | 4/2007 | Okayama et al. | 348/340 |
| 2008/0088840 A1 * | 4/2008 | Bodkin et al. | 356/328 |
| 2008/0297861 A1 * | 12/2008 | Noffke | 358/509 |
| 2009/0213371 A1 * | 8/2009 | Goodyer et al. | 356/319 |
| 2009/0317935 A1 | 12/2009 | Toda et al. | |
| 2011/0299104 A1 | 12/2011 | Seo et al. | |

FOREIGN PATENT DOCUMENTS

| | | |
|---|---|---|
| JP | 03-146833 A | 6/1991 |
| JP | 6-129908 A | 5/1994 |
| JP | 2001296180 A | 10/2001 |
| JP | 2002310799 A | 10/2002 |
| JP | 2003139702 A | 5/2003 |
| JP | 3566334 B2 | 6/2004 |
| JP | 2005315883 A | 11/2005 |
| JP | 2008518218 A | 5/2008 |
| JP | 2010190672 A | 9/2010 |
| JP | 2010-256324 A | 11/2010 |
| WO | WO-02/50783 A1 | 6/2002 |
| WO | WO-03038383 A1 | 5/2003 |

* cited by examiner

FIG.18
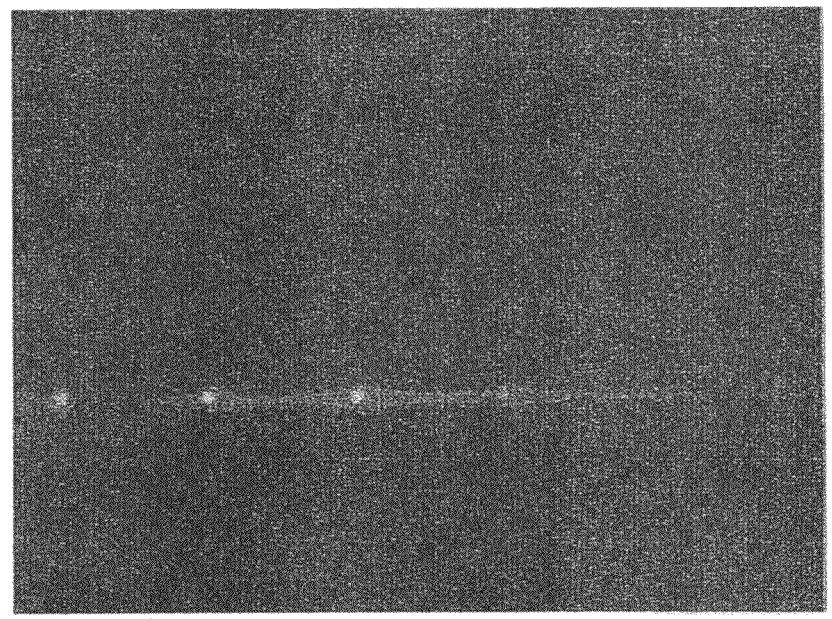
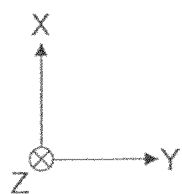

FIG.23
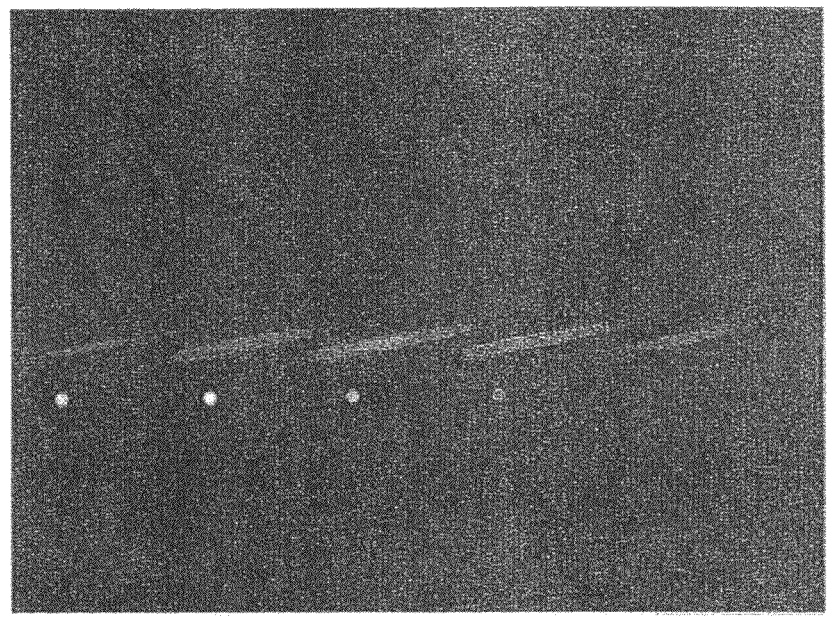
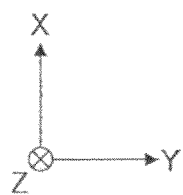

SPECTRAL CHARACTERISTIC OBTAINING APPARATUS, IMAGE EVALUATION APPARATUS AND IMAGE FORMING APPARATUS

TECHNICAL FIELD

The present invention relates to spectral characteristic obtaining apparatuses, image evaluation apparatuses and image forming apparatuses. More specifically, the present invention relates to a spectral characteristic obtaining apparatus that obtains a spectral characteristic of an image formed on an image holding medium, an image evaluation apparatus that includes the spectral characteristic obtaining apparatus, and an image forming apparatus that includes the image evaluation apparatus.

BACKGROUND ART

There are a variety of image products such as printers, copiers, and high-value added products of the printers and copiers including a communication function, such as combined machines and commercial printing machines in the market. In image forming methods, there are a variety of methods such as an electro photographic method, an inkjet method, and a thermal method. Also, in a field of production printing, digitalization technology in both a sheet type machine and a continuous business form type machine has been advancing. Recently, products such as the electro photographic type machine and the inkjet type machine have been brought into the market. In view of user's needs, demands for high image quality, personal information assurance and accurate color reproduction has been increasing as multidimensional images, and high-definition and high-density images can be gained by converting black and white print to color print. Also, diversification of service forms provided for the users proceeds, including advertising corresponding to personal preference in high image quality photographic print, brochure print, bill and so on.

As techniques corresponding to a high-quality picture technology, products related to the following techniques have been launched into the market: products that include a concentration sensor to detect toner concentration of an intermediate transcriptional body and a photoreceptor before being firmly fixed, and stabilize a toner supply amount in the electro photographic type; products that take an image of an output image by camera and inspect the image by character recognition or variance detection by a difference between the images without depending on the image forming type in the personal information assurance; and products that output a color patch, measure a color of one or plural points by spectrometer and perform calibration in the color reproduction. These techniques are desirable to be performed for a whole area of the image to respond to image variance between pages or within a page. Examples of evaluation techniques in full width measurement of the image are given as the following.

For example, Japanese Patent Application Publication No. 2008-518218 (which is hereinafter called Patent Document 1) discloses a technique that measures a spectral characteristic of a full width, by lining up plural line-shaped light receiving devices as a detection system and by setting a mechanism to relatively move a measurement object to the detection system. Further, a light shielding wall is set to prevent crosstalk between the light receiving devices by reflected light from the measurement object area.

Moreover, Japanese Patent Application Publication No. 2005-315883 (which is hereinafter called Patent Document 2) discloses a technique that obtains a spectral characteristic of a full width by emitting light continuously from a light source with different light wavelength bands across the full width and by obtaining reflected light.

Furthermore, Japanese Patent Application Publication No. 2002-310799 (which is hereinafter called Patent Document 3) discloses a technique that emits light to a full width of a printing surface, detects a concentration of a certain area by a line sensor camera, averages the concentration and compares the averaged concentration with a reference concentration.

In addition, Japanese Patent Registration Publication No. 3566334 (which is hereinafter called Patent Document 4) discloses a technique that scans a manuscript and a specified manuscript plural times and evaluates a similarity degree of common color information from logical addition processing between images.

Also, Japanese Patent Application Publication No. 2003-139702 (which is hereinafter called Patent Document 5) discloses a technique that emits light to a full width of a printing surface, and obtains a spectral characteristic of the full width by a combination of CCD (i.e., Charge Coupled Device) and either a diffraction grating or a refraction grating.

However, if a color of an image is measured across a full width, the following configurations are considered in general: a configuration that emits plural lights limited in different wavelength bands and takes an image by an area sensor, or relatively moves a measurement system and an object to be inspected, taking an image by a line sensor; and a configuration that sets plural imaging systems and limits wavelength bands of reflected light from the object to be inspected incident on the imaging system. On this occasion, in an image corresponding to plural obtained wavelength bands, if a difference occurs at positions of the object to be inspected between the images, it is impossible to measure color information at each position of the object to be inspected.

Here, as a method that measures the color information from plural images in different wavelength bands, there is a method that compares intensity of the reflected light obtained at the position of object to be inspected of each the images with a reference of an original image or manuscript data. Also, there is a method that estimates a continuous spectral characteristic from the intensity of the reflected light amount obtained at a position of the object to be inspected of each of the images, by applying Winner estimation. Therefore, if a different position is selected as an object to be inspected in each of the images, an error would occur in comparison with the reference or estimation of the continuous spectral characteristic.

The technique disclosed in Patent Document 1 uses the line-shaped measurement system and uses a general configuration that can measure the image color of the object to be inspected across the full width. However, the technique does not include a measure that reduces the position gap of the images obtained at each of the wavelength bands.

The technique disclosed in Patent Document 2 uses a configuration that obtains the reflected light from the object to be inspected by the continuous irradiation light from the light source with different wavelength bands, but it is impossible for the configuration to measure the spectral characteristic of the same position of the object to be inspected because of occurrence of time lag. If the configuration had included plural pairs of the light source and the light receiving system, the positions to be inspected of each of the images in different wavelength bands could have been highly likely shifted.

The technique disclosed in Patent Document 3 also has had a configuration that obtains the color information across the full width, but the technique seems to use a representative value by a process that averages the concentration of the detected area, which cannot ensure color distribution of the object to be inspected.

The technique disclosed in Patent Document 4 determines the similarity degree by comparing the object to be inspected with the manuscript in each of the wavelength bands, but cannot specify color variation of the object to be inspected. Moreover, even if the image is reconstituted from the color information of the individually obtained image, it has been impossible to determine whether the color variation has occurred in an actual object to be inspected.

The technique disclosed in Patent Document 5 has big restrictions in speed to obtain the color information of the image holding medium (e.g., paper) of an object to be read because a reading speed for the line sensor dramatically decreases due to a restriction of a data reading characteristic of the CCD with a two-dimensional pixel structure.

SUMMARY OF INVENTION

Embodiments of the present invention may provide a novel and useful spectral characteristic obtaining apparatus, an image evaluation apparatus and an image forming apparatus to solve or reduce one or more of the above-described problems.

More specifically, the embodiments of the present invention may provide a spectral characteristic obtaining apparatus, an image evaluation apparatus and an image forming apparatus whereby a high-speed data reading is possible, and an alignment of an observation position in plural wavelength bands is unnecessary.

According to one embodiment of the present invention, a spectral characteristic obtaining apparatus is provided to obtain a spectral characteristic of light including:

a light irradiation unit configured to emit light onto a reading object;

a spectroscopic unit configured to separate at least a part of diffused reflected light from the light emitted onto the reading object by the light irradiation unit into a spectrum; and a light receiving unit configured to receive the diffused reflected light separated into the spectrum by the spectroscopic unit and to obtain a spectral characteristic, wherein the light receiving unit is configured to be a spectroscopic sensor array including plural spectroscopic sensors arranged in a direction, and wherein the spectroscopic sensors include a predetermined number of pixels arranged in the direction to receive lights with different spectral characteristics from each other.

According to another embodiment of the present invention, an image evaluation apparatus is provided to evaluate a color of an image formed on an image holding medium in plural colors including a spectral characteristic obtaining apparatus, the spectral characteristic obtaining apparatus including, a light irradiation unit configured to emit light onto a reading object;

a spectroscopic unit configured to separate at least a part of diffused reflected light of the light emitted onto the reading object from the light irradiation unit into a spectrum; and a light receiving unit configured to receive the diffused reflected light separated into the spectrum by the spectroscopic unit and to obtain a spectral characteristic, wherein the light receiving unit is configured to be a spectroscopic sensor array including plural spectroscopic sensors arranged in a direction, and wherein the spectroscopic sensors include a predetermined number of pixels arranged in a direction to receive lights with different spectral characteristics from each other, the image evaluation apparatus including:

a conveyance unit configured to convey the image holding medium; and an evaluation unit configured to evaluate a color of the image based on the spectral characteristic obtained by the spectral characteristic obtaining apparatus.

According to another embodiment of the present invention, an image forming apparatus including an image evaluation apparatus, the image evaluation apparatus including a spectral characteristic obtaining apparatus, the spectral characteristic apparatus including, a light irradiation unit configured to emit light onto a reading object;

a spectroscopic unit configured to separate at least a part of diffused reflected light of the light emitted onto the reading object from the light irradiation unit into a spectrum; and a light receiving unit configured to receive the diffused reflected light separated into the spectrum by the spectroscopic unit and to obtain a spectral characteristic, wherein the light receiving unit is configured to be a spectroscopic sensor array including plural spectroscopic sensors arranged in a direction, and wherein the spectroscopic sensors include a predetermined number of pixels arranged in a direction to receive lights with different spectral characteristics from each other, the image evaluation apparatus including, a conveyance unit configured to convey the image holding medium; and an evaluation unit configured to evaluate a color of the image based on the spectral characteristic obtained by the spectral characteristic obtaining apparatus, the image forming apparatus including:

a photoreceptor to which a color material is applied and developed; and an intermediate transcriptional body to transfer the color material onto the image holding medium.

Other objects, features and advantages of the present invention will become more apparent from the following detailed description when read in conjunction with the accompanying drawings.

BRIEF DESCRIPTION OF DRAWINGS

FIG. 18 is a first photograph showing where light incident on a line sensor is seen from an incidence plane side;

FIG. 23 is a second photograph showing where light incident on a line sensor is seen from an incidence plane side;

DESCRIPTION OF EMBODIMENTS

A description is given, with reference to the accompanying drawings, FIG. 1 through FIG. 36, of embodiments of the present invention.

First Embodiment

Figure 1:
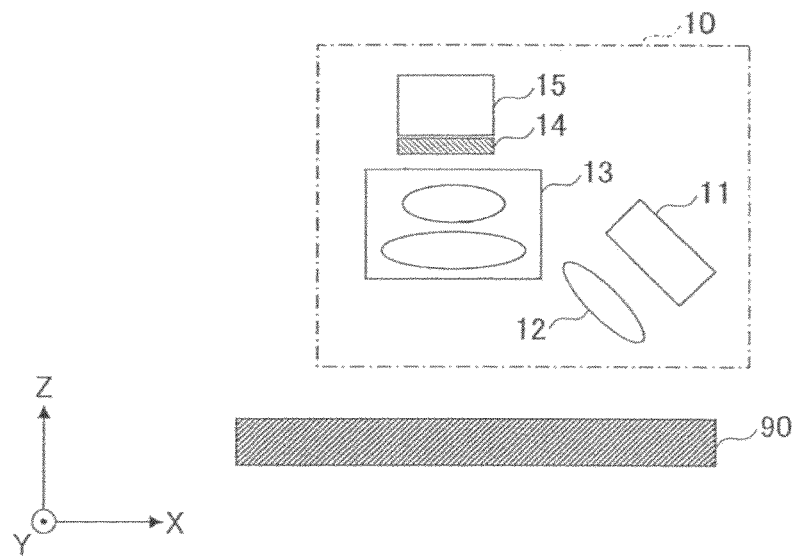
FIG. 1 is a diagram illustrating a spectral characteristic obtaining apparatus of a first embodiment of the present invention.

FIG. 1 is a diagram illustrating a spectral characteristic obtaining apparatus of a first embodiment. Referring to FIG. 1, the spectral characteristic obtaining apparatus includes a line illumination light source 11, a collimating lens 12, an imaging optical system 13, a filter array 14, and a line sensor 15. An image holding medium (e.g., paper and the like) 90 is also shown in FIG. 1.

The line illumination light source 11 has a function to emit light. As the line illumination light source 11, for example, a white LED (i.e., Light Emitting Diode) array that has intensity of light in almost all ranges of visible light are available. As the line illumination light source 11, a fluorescent light such as a cold-cathode tube and a lamp light source are also available. Here, the line illumination light source 11 is desirable to emit light in a wavelength range necessary for dispersion, and to be able to homogeneously illuminate an entire observation area. The collimated lens 12 has a function to collimate light emitted from the line illumination light source 11 and irradiate the image holding medium 90 with the collimated light. The line illumination light source 11 and the collimating lens 12 constitute a typical example of a light irradiation unit of the present invention. However, the collimating lens 12 can be omitted.

The imaging optical system 13 is constructed from plural lenses, and has a function as an imaging unit to form an image onto the line sensor 15 through the filter array 14 from diffused reflected light emitted onto the image holding medium 90. The imaging optical system 13 and the filter array 14 constitute a typical example of a spectroscopic unit of the present invention.

The line sensor 15 is constructed from plural pixels, and has a function as a light receiving unit to obtain a diffused reflected light amount in a predetermined wavelength band incident through the filter array 14. As the line sensor 15, for example, a MOS (i.e., Metal Oxide Semiconductor Device), a CMOS (i.e., Complementary Metal Oxide Semiconductor Device), a CCD (i.e., Charge Coupled Device) and a CIS (i.e., Contact Image Sensor) can be used.

Figure 2:
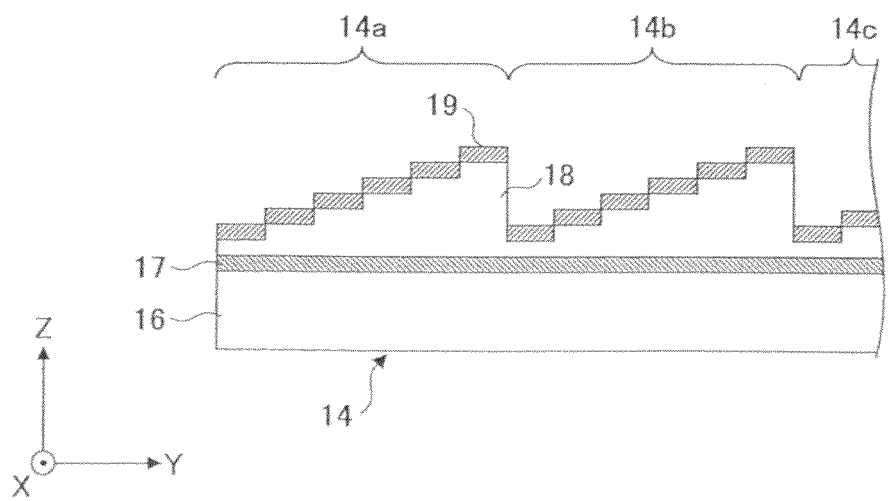
FIG. 2 is a diagram illustrating a frame format of a cross section structure of a filter array.

Here a more detailed description is given about the filter array 14 and the line sensor 15 below. FIG. 2 is a diagram illustrating a frame format of a cross section structure of the filter array 14. In FIG. 2, the same numerals may be used for the same components as those in FIG. 1, and an explanation may be omitted about the components. Referring to FIG. 2, the filter array 14 includes a first reflective layer 17 formed on a glass substrate 16 as a film, a spacer layer 18 formed into a stair-like shape, and a second reflective layer 19 further formed on the spacer layer 18 as a film. The first reflective layer 17, the spacer layer 18 and the second reflective layer 19 constitute a Fabry-Perot interference filter, which can realize a filter array with plural spectral transmission characteristics because a thickness of the spacer layer 18 differs depending on a location.

The filter array 14 includes plural filters 14a, 14b, 14c arranged in a direction that separate the diffused reflected light obtained from the light emitted onto the image holding medium 90 into a spectrum. In each of the filters 14a, 14b, 14c and the like, the number of the steps included in the spacer layer 18 is N (which hereinafter represents a counting number more than or equal to two). The N steps included in the spacer layer 18 constitute N wavelength filters of different transmission wavelength characteristics.

Figure 3:
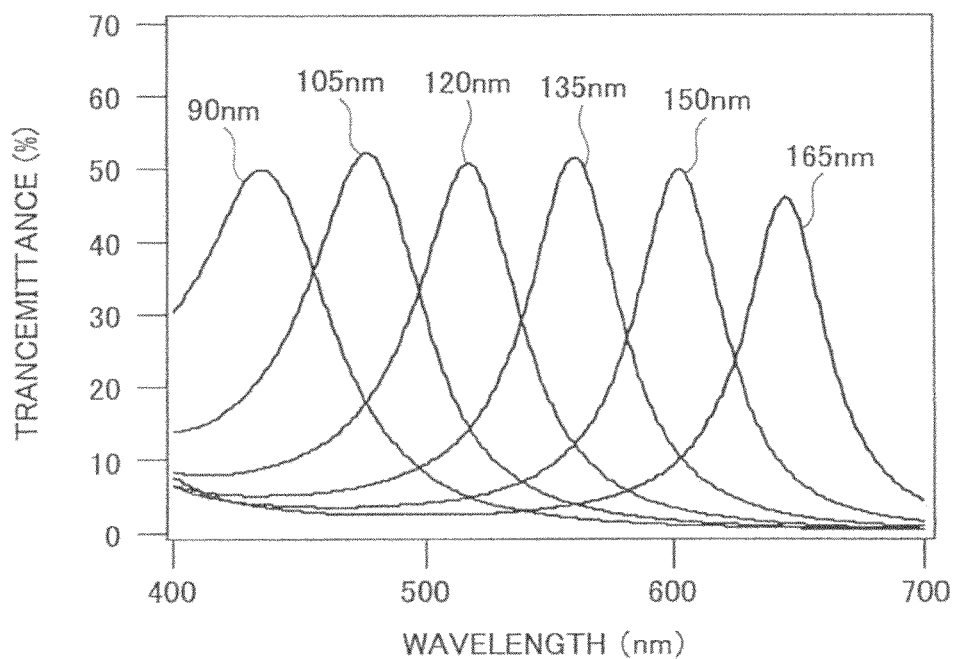
FIG. 3 is a diagram illustrating a spectral transmittance of a filter array.

As a material of the first reflective layer 17 and the second reflective layer 18, aluminum (i.e., Al) or silver (i.e., Ag) that has a high reflectance in a whole visible light range is desirable to be used. As a material of the spacer layer 18, silica dioxide (i.e., $SiO_2$) that has a high reflectance for the visible light can be used. As an example, FIG. 3 shows a spectral transmittance of the filter array 14 where the silver (Ag) 30 nm thick is used for the first reflective layer 17 and the second reflective layer 18, and the silica dioxide ($SiO_2$) is used for the spacer layer 18. FIG. 3 is a diagram illustrating the spectral transmittance of the filter array 14. Numerals shown in FIG. 3 mean a thickness of the spacer layer 18. Referring to FIG. 3, since the spacer layer 18 is varied in thickness at 15-nanometer intervals in a range of 90 nm to 165 nm according to a location, a filter array that differs in spectral transmittance according to the location is realized.

In this way, the filter array 14 including N arranged wavelength filters with different transmittances can be realized. In the example in FIG. 3, N equals six (which means the step number of the stairs is six). Though FIG. 2 illustrates the stair-like spacer layer 18, the spacer layer 18 may have a wedge shape. Moreover, the configuration of the filter array 14 is not limited to the Fabry-Perot interference filter. It is possible for the configuration of the filter array 14 to utilize many existing inventions including a configuration that uses a dielectric multilayer with a different film structure according to a location, a configuration applied with plural absorbing pigments, a configuration constructed of photonic crystal structure and so on. Furthermore, it is desirable to integrate the filter array 14 and the line sensor 15 in order to prevent influence of a position gap caused by a shock or vibrations.

Figure 4:
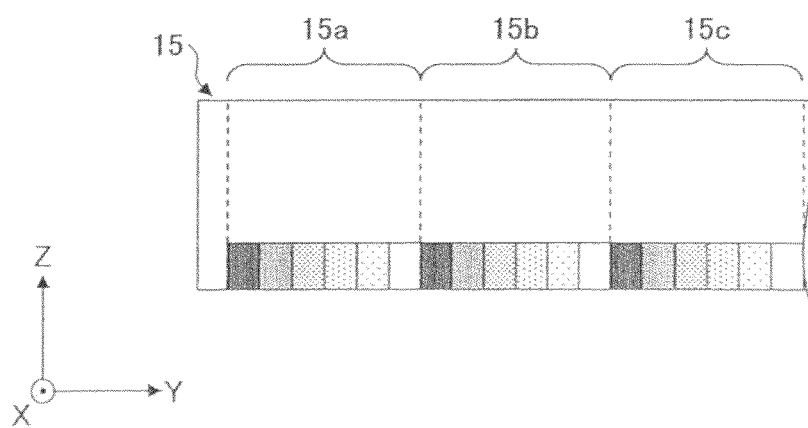
FIG. 4 is a diagram illustrating a frame format of a pixel structure of a line sensor.

FIG. 4 is a diagram illustrating a frame format of a pixel structure of the line sensor 15. In FIG. 4, the same components or parts as those in FIG. 1 may be expressed with the same numerals, and an explanation about the components or parts may be omitted. Referring to FIG. 4, the line sensor 15 has a pixel structure that includes plural pixels arranged in Y direction (which means a depth direction perpendicular to the paper plane in FIG. 1). The line sensor 15 is configured of a spectroscopic sensor array including plural spectroscopic sensors 15a, 15b, 15c arranged in the Y direction, each of which includes N pixels arranged in the Y direction as a group. The spectroscopic sensors 15a, 15b, 15c have N pixels that receive lights with different spectral characteristics from each other, arranged in the Y direction.

The value of N, which means the number of pixels constituting the spectroscopic sensors 15a, 15b, 15c and the like, corresponds to the number of the wavelength filters of N constituting the filter array 14. In the example of FIG. 4, N equals six. The N lights with different spectral characteristics from each other separated by the filter array 14 are incident on the N pixels that constitute spectroscopic sensors 15a, 15b, 15c and the like.

Returning to FIG. 1, an image on the image holding medium 90 of the reading object is irradiated by the light irradiation unit constructed of the illumination light source 11 and the collimating lens 12 in a line shape extending to the depth direction (which means the Y direction in FIG. 1) of the image holding medium 90. The diffused reflected light from the image on the image holding medium 90 is led to the line sensor 15 by the spectroscopic unit constructed of the imaging optical system 13 and the filter array 14.

The optical system illustrated in FIG. 1 is a so-called 45/0 optical system where the illumination light emitted from the illumination light source 11 is incident on the image holding medium 90 obliquely at approximately 45 degrees, and the line sensor 15 receives the light that diffuses and reflects from the image holding medium 90 in a perpendicular direction. However, the configuration of the optical system is not limited to that in FIG. 1. For example, a so-called 0/45 optical system is possible where the illumination light emitted from the illumination light source 11 is perpendicularly incident on the image holding medium 90, and the line sensor 15 receives the light diffusing and reflecting from the image holding medium 90 in a 45 degree direction.

In this way, the spectral characteristic obtaining apparatus of the first embodiment obtains the spectral characteristic by using the line sensor 15 configured as the spectral sensor array including the plural spectroscopic sensors 15a, 15b, 15c arranged in a predetermined direction, where each of the spectroscopic sensors 15a, 15b, 15c includes the plural (i.e., N) pixels arranged in the predetermined direction that receive lights with different spectral characteristics from each other. As a result, it is possible to read data at high speed because the spectral characteristic can be obtained without using a sensor of two-dimensional pixel structure that has a slow reading speed.

Moreover, in a conventional spectral characteristic obtaining apparatus that takes images in plural wavelength bands by different imaging systems respectively, there is a need of an alignment of each of the imaging systems at each observation position, or a problem of a position gap occurs, which causes a configuration of the spectral characteristic obtaining apparatus to be difficult. On the other hand, the spectral characteristic obtaining apparatus in the first embodiment does not need an alignment because the configuration of the spectral characteristic obtaining apparatus formed of a row of line sensor prevents the position gap of the observation position. As a result, it is possible to realize the spectral characteristic obtaining apparatus with a high degree of accuracy by a simple structure.

In other words, according to the first embodiment, it is possible to realize the spectral characteristic obtaining apparatus that can read data at a high speed and does not need the alignment at the observation positions in the plural wavelength bands when measuring the spectral characteristic of the reading object across the full width.

Second Embodiment

In the first embodiment, since the imaging optical system 13 forms an image on the line sensor 15 from the image on the image holding medium 90 as shown in FIG. 1, each of the N pixels constituting one spectroscopic sensor (e.g., spectroscopic sensor 15a) receives light from different positions on the image holding medium 90. This does not cause problems when the image on the image holding medium 90 has a rougher structure than a pixel structure. However, if the image has a similar fine structure compared to the pixel structure, obtaining an exact spectral characteristic of the measurement object becomes difficult because the plural pixels constituting the spectroscopic sensor (e.g., spectroscopic sensor 15a) form different images respectively. Accordingly, in a second embodiment, in order to solve such a problem, an example is given where a homogeneous optical system is added to the spectral characteristic obtaining apparatus shown in FIG. 1.

Figure 5:
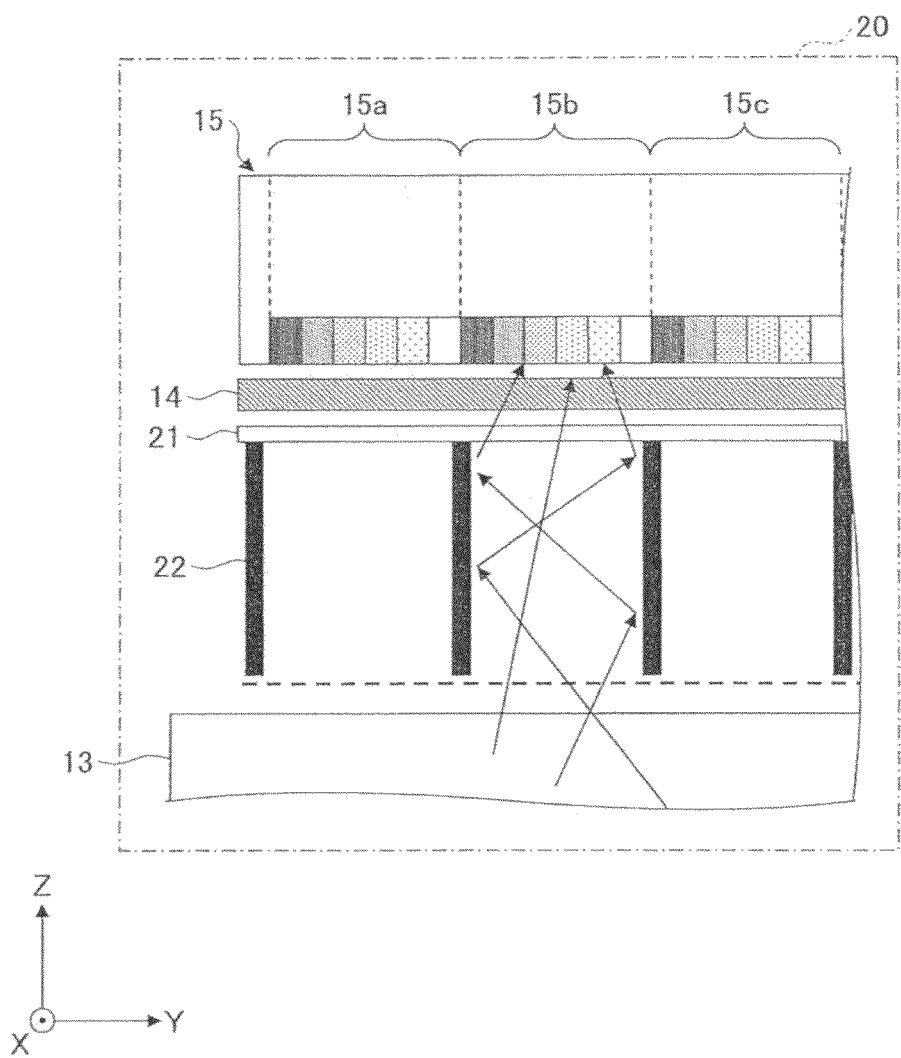
FIG. 5 is a diagram illustrating a part of a spectral characteristic obtaining apparatus of a second embodiment of the present invention.

FIG. 5 is a diagram illustrating a part of the spectral characteristic obtaining apparatus of the second embodiment. In FIG. 5, the same numerals may be used for the same components as those in FIG. 1 and FIG. 4, and an explanation about the components may be omitted. Referring to FIG. 5, the spectral characteristic obtaining apparatus 20 includes a hollow rod array 22 formed on the supporting substrate 21. The hollow rod array 20 formed on the supporting substrate 21 functions as a homogeneous optical system. A configuration other than the hollow rod array 22 formed on the supporting substrate 21 is similar to that of the spectral characteristic obtaining apparatus 10 of the first embodiment. Hereinafter, an explanation about a common part to the first embodiment is omitted, and a different part from the first embodiment is mainly explained.

The hollow rod array 22 formed on the supporting substrate 21 is disposed between the filter array 14 disposed adjacent to the line sensor 15 and the imaging optical system 13. Metal is deposited on side surfaces of the rod array 22, which has a high reflectance. The imaging optical system 13 forms an image at an opening part (which is shown by a doted line in FIG. 5) from the image of the reading object (which means a dotted line part becomes an imaging plane). The light incident on the rod array 22 is homogenized by being repeatedly reflected by the side surfaces of the rod array 22 as shown by arrows in FIG. 5, and then enters the filter array 14 and the line sensor 15. This makes it possible to prevent the different pixels from forming different images because the incident light on the N pixels is homogenized even if a fine image is formed at the imaging plane.

Figure 6:
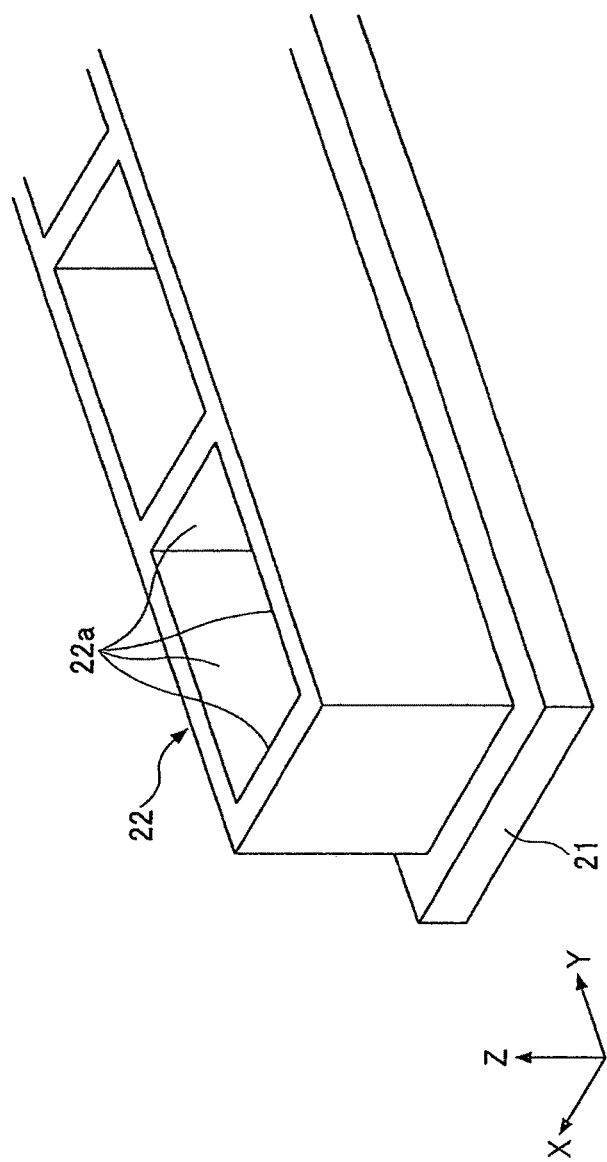
FIG. 6 is a diagram illustrating an enlarged frame format of a neighborhood of a rod array.

FIG. 6 is a diagram illustrating an enlarged frame format of the rod array neighborhood. In FIG. 6, the same numerals may be used for the same components as those in FIG. 5, and an explanation about the components may be omitted. Referring to FIG. 6, the rod array 22 is made of a reflective member as a homogenized optical material, and homogenizes the incident light by using the side surfaces of the hollow structure as a reflection surface. For example, the reflection surface is formed by depositing metal on the side surfaces 22a of the hollow structure. As the metal deposited on the side surfaces 22a, for example, aluminum (Al) or silver (Ag) and the like with a high visible light reflectance can be used. In the rod array 22 shown in FIG. 6, it is possible to use a scatterer instead of the reflective member as the homogenizing optical material. On this occasion, it is desirable for the scatterer to use a white scatterer that has high reflectance and hardly has the spectral characteristic. As the white scatterer, for example, the scatterer to which barium sulfate powder such as titanium oxide is applied, the scatterer to which metal oxide particles such as titanium oxide are applied and the scatterer to which foamed polymer such as foamed polyester is applied can be used. It is possible to apply these scatterer materials to the side surfaces 22a of the hollow structure.

Figure 7:
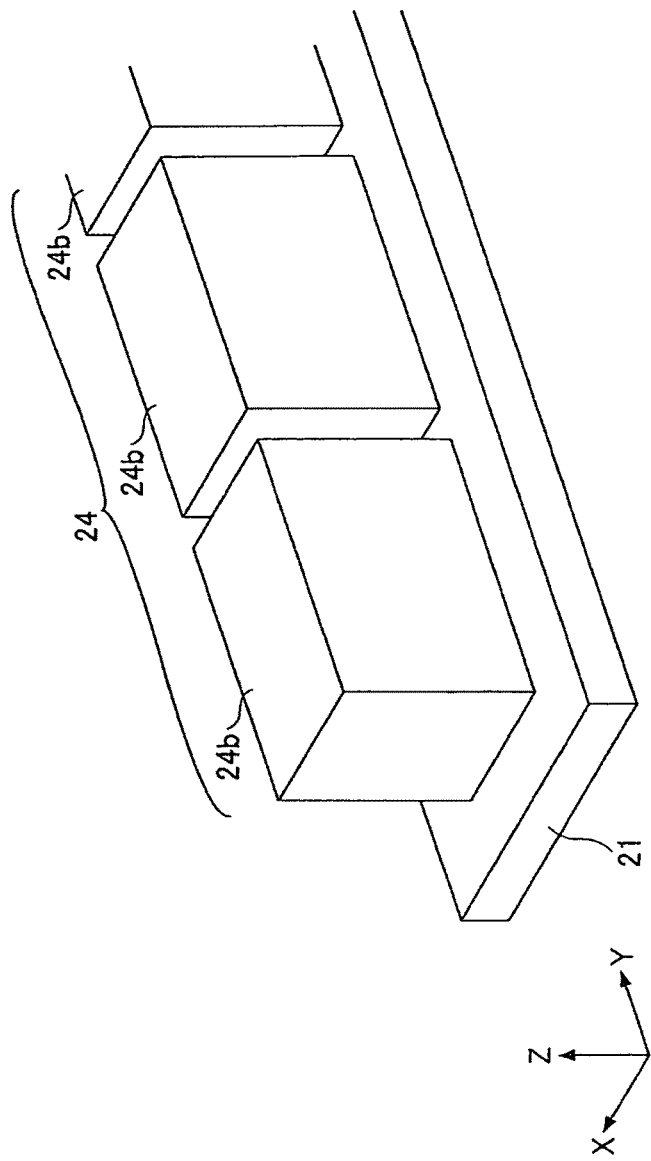
FIG. 7 is a diagram illustrating another example of a rod array structure.

FIG. 7 is a diagram illustrating another example of a structure of a rod array. In FIG. 7, the same numerals may be used for the same components as those in FIG. 5, and an explanation about the components may be omitted. Using a rod array 24 shown in FIG. 7 is possible instead of the rod array 22 shown in FIG. 6. Referring to FIG. 7, it is possible for the rod array 24 to use a transparent body 24b as a homogenizing optical material, which homogenizes the incident light by internal total reflection of the transparent body 24b. For example, inorganic materials such as glass or quarts, polycarbonate and polymer such as cycloolefin system polymer can be used as the transparent body 24b. The configuration that utilizes the internal total reflection illustrated in FIG. 7 is superior, since it is possible to easily make the rod array 24 by using a mold such as an injection mold.

Thus, according to the second embodiment, there are not only similar advantages to the first embodiment, but also the following advantages. That is, the spectral characteristic obtaining apparatus of the second embodiment includes the homogenizing optical system that homogenizes the diffused reflected light from the reading object by the plural times of the reflection or dispersion. As a result, it is possible for the N pixels constituting the spectroscopic sensor to receive the diffused light from almost the same position of the reading object and to prevent a measurement error caused by receiving the diffused light from different positions of the reading object. This makes it possible to obtain a more accurate spectral characteristic of the measurement object.

Third Embodiment

The first embodiment shows an example that obtains a one-dimensional spectral characteristic, but a third embodiment shows an example that obtains a two-dimensional spectral characteristic. In the spectral characteristic obtaining apparatus 10 shown in FIG. 1, a two-dimensional spectral characteristic can be obtained by providing a conveyance unit to convey the image holding medium 90 in X direction in FIG. 1, and by continuously obtaining the line shaped (which means one dimension) spectral characteristic, conveying the image holding medium 90. Moreover, the two-dimensional spectral characteristic can be obtained by a method that scans by driving the spectroscopic sensor array, or by a method that scans the measurement position by a scanning optical system installed in the spectroscopic sensor array, instead of the configuration that provides the conveyance unit in the spectral characteristic obtaining apparatus 10 shown in FIG. 1. An example of a configuration that obtains the two-dimensional spectral characteristic is shown hereinafter, but an explanation about a part common to the first embodiment is omitted, and a different part from the first embodiment is mainly explained.

Figure 8:
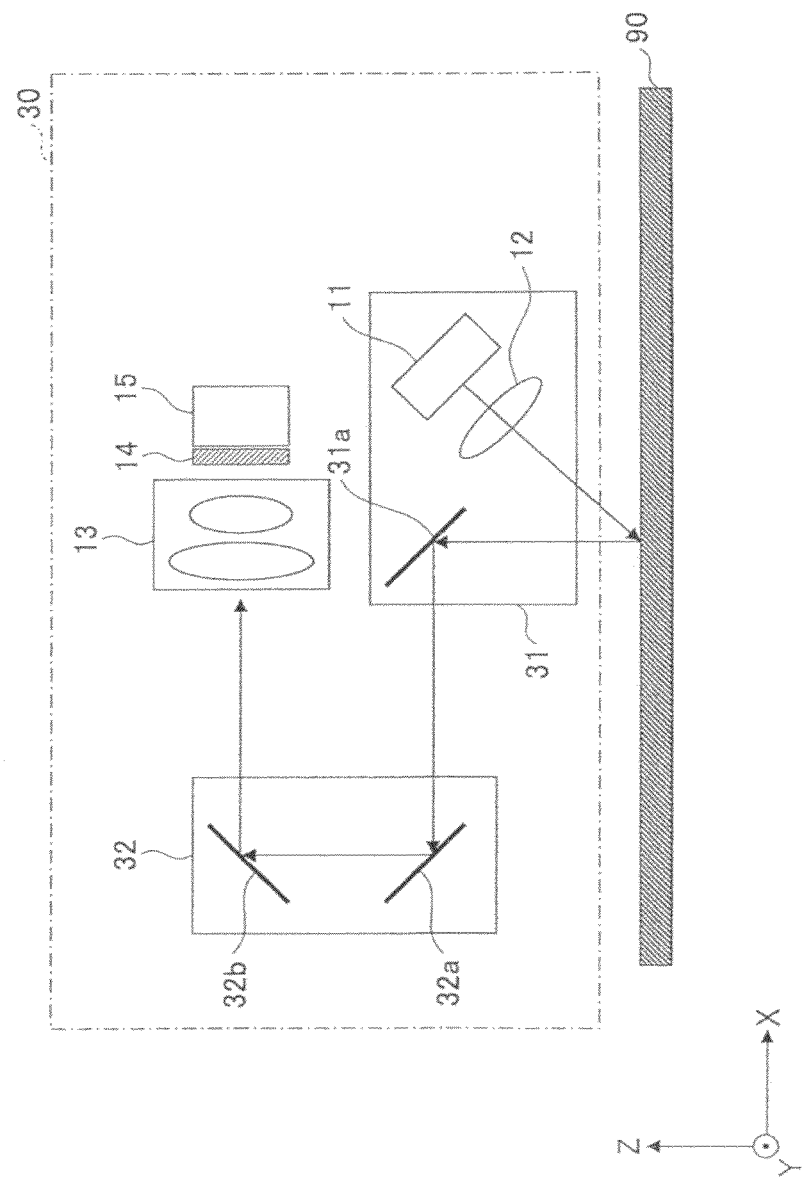
FIG. 8 is a diagram illustrating a third embodiment of a spectral characteristic obtaining apparatus of the present invention.

FIG. 8 is a diagram illustrating a spectral characteristic obtaining apparatus of the third embodiment. In FIG. 8, the same numerals may be used for the same components as those in FIG. 1, and an explanation about the components may be omitted. Referring to FIG. 8, a spectral characteristic obtaining apparatus 30 includes a first traveling body 31, a second traveling body 32, an imaging optical system 13, a filter array 14 and a line sensor 15. The first traveling body 31 and the second traveling body 32 constitute a typical example of a transportation unit of the present invention.

The first traveling body 31 includes a line illumination light source 11, a collimating lens 12, and a first mirror 31a, and is configured to be able to travel by a driving mechanism (which is not shown in FIG. 8) in X direction. The first mirror 31a has a function to reflect light emitted onto an image holding medium 90 from the line illumination light source 11 through the collimating lens 12, as diffused reflected light toward the second mirror 32a. As the first mirror 31a, for example, a reflecting mirror, a surface of which is coated with a metal film and the like, can be used.

The second traveling body 32 includes a second mirror 32a and a third mirror 32b, and is configured to be able to travel by a driving mechanism (which is not shown in FIG. 8) in the X direction. However, for example, the second traveling body 32a is configured to travel only a half of a distance that the first traveling body 31 travels. The second mirror 32a has a function to reflect the diffused reflected light reflected by the first mirror 31a toward the third mirror 32b. The third mirror 32b has a function to reflect the diffused reflected light reflected by the second mirror 32a toward the imaging optical system 31. As the second mirror 32a and the third mirror 32b, for example, a reflecting mirror, a surface of which is coated with a metal film, can be used. For example, the second traveling body 32 travels only a half of a distance that the first traveling body 31 travels and changes a measurement position continuously, by which the two-dimensional spectral characteristic can be obtained. Here the spectral characteristic obtaining apparatus 30 does not include a conveyance unit to convey the image holding medium 90 in the X direction.

In this way, the third embodiment has not only advantages similar to the first embodiment, but also the following advantages. That is, the spectral characteristic obtaining apparatus of the third embodiment includes the traveling unit that scans the image holding medium 90. As a result, the two-dimensional spectral characteristic can be obtained by continuously obtaining spectroscopic data in a direction, scanning the image holding medium 90.

Fourth Embodiment

In a fourth embodiment, an example of a spectral characteristic obtaining apparatus different from the first embodiment is shown. Hereinafter, an explanation is omitted about a part common to the first embodiment, and a different part from the first embodiment is mainly explained.

Figure 9:
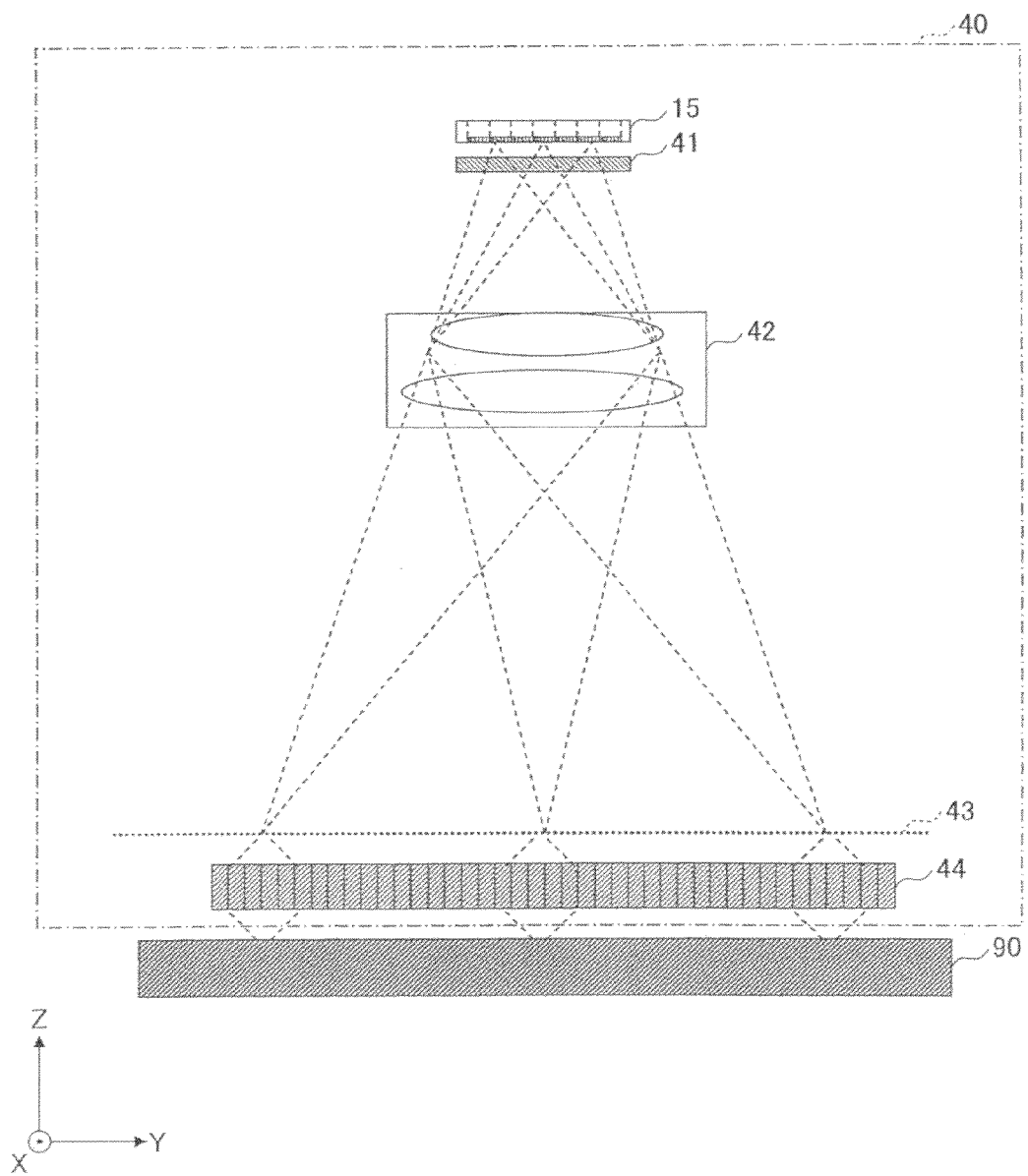
FIG. 9 is a diagram illustrating a fourth embodiment of a spectral characteristic obtaining apparatus of the present invention.
Figure 10:
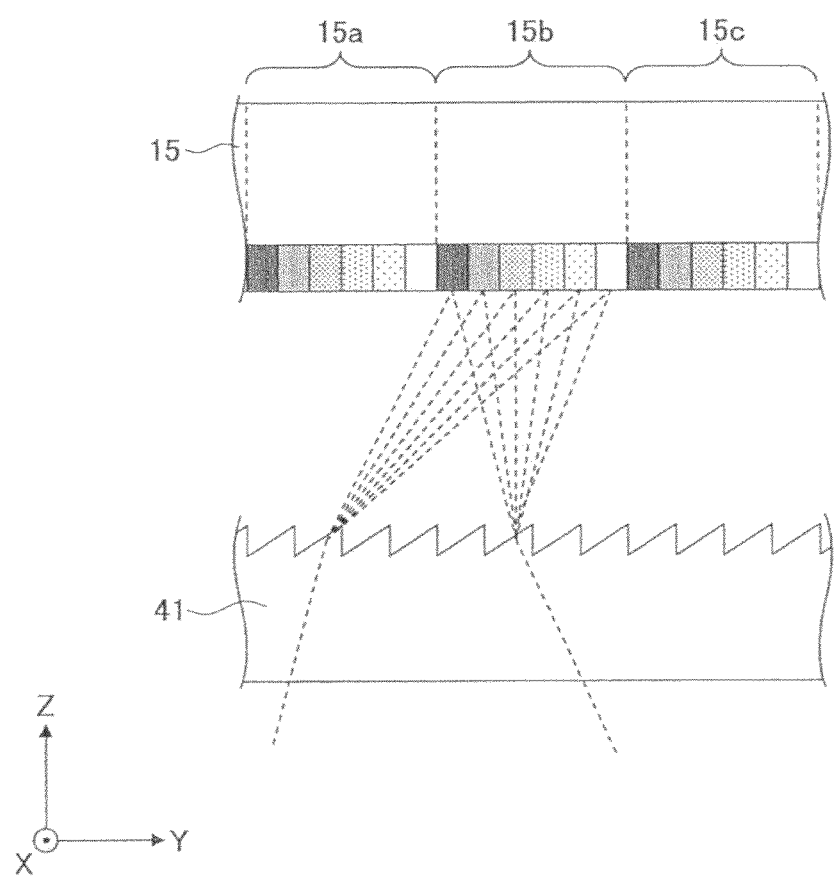
FIG. 10 is a diagram illustrating an enlarged frame format of a part of FIG. 9.

FIG. 9 is a diagram illustrating the spectral characteristic obtaining apparatus of the fourth embodiment. FIG. 10 is an enlarged diagram illustrating a frame format of a part of FIG. 9. In FIG. 9 and FIG. 10, the same numerals may be used for the same components as those in FIG. 1, and an explanation about the components may be omitted. Referring to FIG. 9 and FIG. 10, the spectral characteristic obtaining apparatus 40 includes a line illumination light source 11, a collimating lens 12, a line sensor 15, a diffraction device 41, an imaging optical system 42 of a first imaging unit, a pinhole array 43 and a selfoc lens 44. The pinhole array 43 is a typical example of an opening line of the present invention.

Here an illumination optical system (which includes the line illumination light source 11 and the collimating lens 12) is not shown in FIG. 9, but the same illumination system as that described in FIG. 1 is included. The illumination optical system irradiates the image holding medium 90 at an oblique 45 degree angle from the depth direction of the paper plane (i.e., X direction in FIG. 9).

Dotted lines in FIG. 9 show a frame format of typical light paths of the diffused reflected lights from the image holding medium 90. The image on the image holding medium 90 is formed as an image on the pinhole array 43 by the selfoc lens 44, and an area of the image formed on the pinhole is divided into small areas. Furthermore, the image divided into the small areas on the pinhole array 43 is formed as an image on pixels of the line sensor 15 after being separated into a spectrum by the imaging optical system 42 and the diffraction device 41.

The diffraction device 41 is disposed adjacent to the line sensor 15, and causes the lights with different spectral characteristics to enter N pixels of the line sensor 15 by making the incident light diffract. For example, the diffraction device 41 includes a saw-tooth structure formed at intervals on a transparent substrate. If a cycle of the saw-tooth structure part of the diffraction device 41 is set as p, the light with wavelength λ incident on the diffraction device 41 at α degree is diffracted into an angle of $\theta_m$, as shown in formula (1). In the formula (1), "m" is a degree of a diffraction grating, which can be a plus and minus integer value.

$$\sin\theta_m = m\frac{\lambda}{p} + \sin\alpha \tag{1}$$

By shaping the diffraction device 41 into the saw-tooth shape shown in FIG. 10, strengthening diffracted light intensity of + first order is possible, which is the most desirable. Adopting a stair-like shape is possible other than the saw-tooth shape. Moreover, if a pixel cycle d of the line sensor 15 is set as 10 μm, when the diffraction device 41 cycle p is set as 10 μm and a distance between the diffraction part of the diffraction device 41 and the line sensor 15 is set as 2 mm, it is possible to separate visible light into about six pixels and to allow entry into the pixels.

Figure 11:
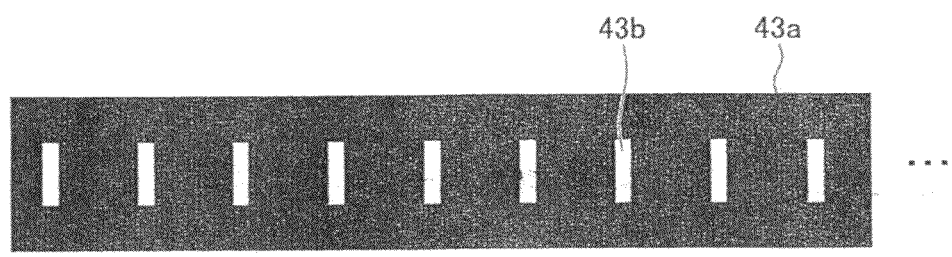
FIG. 11 is a diagram illustrating an example of a pinhole array structure.

FIG. 11 is a diagram illustrating a structure of the pinhole array. Referring to FIG. 11, the pinhole array 43 has a structure that includes rectangular slits of plural openings that let light through, arranged in a line in a light shielding part 43a. Light beams from a slit 43b transmit along the dotted lines shown in FIG. 10, and enter the N pixels of the line sensor 15. One slit 43b corresponds to one spectroscopic sensor, and the one slit 43b and the N pixels have an imaging relationship.

Furthermore, by forming each of the slits 43b and the N pixels in line, it is possible to correspond to the spectroscopic sensor array. As the pinhole array 43, a blackened metal plate including holes, a glass substrate on which a black member such as chromium or carbon-containing resin is formed in a predetermined shape and the like can be used.

Figure 12:
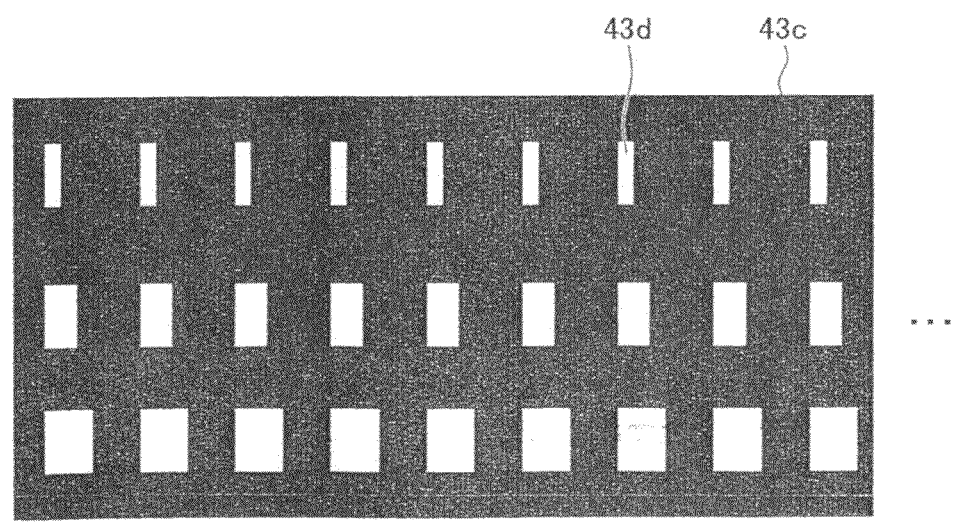
FIG. 12 is a diagram illustrating another example of a pinhole array structure.

FIG. 12 is a diagram illustrating another example of a pinhole array structure. Referring to FIG. 12, the pinhole array 43 has a structure that includes rectangular slits 43d of plural openings that let the light through, arranged in a line in the light shielding part 43c. The slits 43d have plural sizes, which can change a position of the pinhole array 43 according to a predetermined wavelength resolution. In addition, a shape of the opening part is not limited to the rectangular shape but may be an ellipse, a circle and others.

Figure 13:
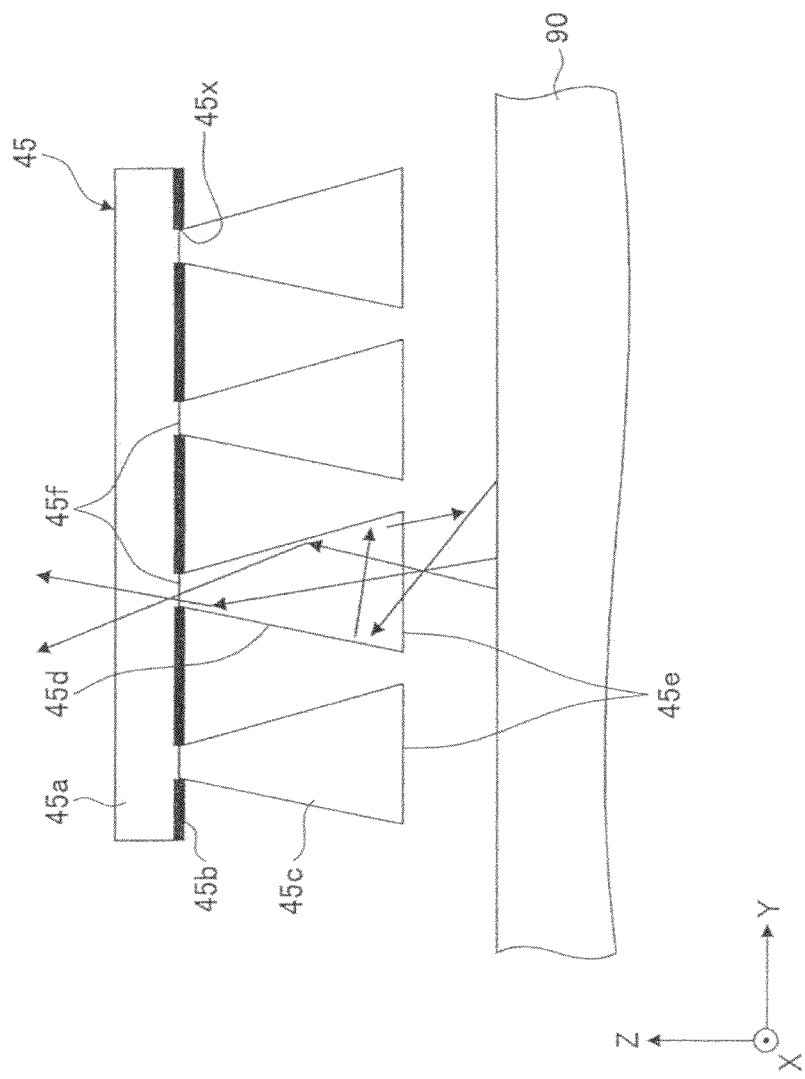
FIG. 13 is a diagram illustrating a taper rod array structure.

In FIG. 9, the selfoc lens 44 is not necessary. A configuration that includes the closely-disposed pinhole array 43 and image holding medium 90 is possible. Also, a microlens array is applicable instead of the selfoc lens 44. Or, as shown in FIG. 13, it is possible to adopt a configuration where a homogeneous optical device such as a tapered rod array is disposed with the pinhole array 43 in an integrated manner. FIG. 13 is a diagram illustrating the tapered rod array structure. In FIG. 13, arrows express light beams in a simulating way.

Referring to FIG. 13, the tapered rod array 45 includes a transparent substrate 45a, a light shielding part 45b including opening parts 45x and formed on the transparent substrate 45a, and tapered rods 45c formed at the opening parts 45X. Side surfaces 45d of the tapered rod 45c work as a reflection surface or an internal total reflection surface, and incident light on an incident surface 45e at a shallow angle goes out of an output surface 45f after reflected repeatedly and homogenized. Moreover, incident light incident on the incident surface 45e at a deep angle is repeatedly reflected by the side surfaces 45d and goes out of the output surface 45f. This allows the tapered rod array 45c to homogenize and output the incident light in a predetermined range and at a predetermined incident angle.

Figure 14A:
FIG. 14A is a first diagram illustrating a taper rod array manufacturing method.
Figure 14B:
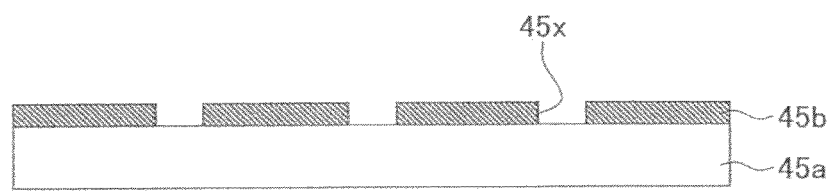
FIG. 14B is a second diagram illustrating a taper rod array manufacturing method.

FIG. 14A through FIG. 14E is a diagram illustrating a manufacturing method of a tapered rod array. To begin with, in a process as shown in FIG. 14A, a transparent substrate 45a is prepared. As a material for the transparent substrate 45a, for example, glass, quarts and the like are available. In particular, to irradiate the transparent substrate 45a with ultraviolet in a following process, using the quarts that has a high permeability to the ultraviolet is more desirable than the others. Next, in a process shown in FIG. 14B, a light shielding part 45b with opening parts 45x is formed on the transparent substrate 45a. As a material for the light shielding part 45b, for example, silver (Ag) and the like are available. The light shielding part 45n including the opening parts 45x (e.g., silver layer) can be formed by using a conventional method. To cite cases, there are a liftoff process that forms a pattern with a photo resist, then forms a metal film, and finally removes the photo resist, an etching process that etches a metal layer using a photo resist as a mask and other processes.

Figure 14C:
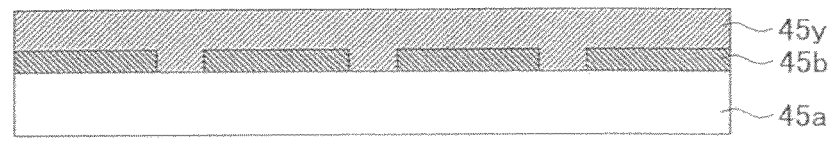
FIG. 14C is a third diagram illustrating a taper rod array manufacturing method.

Next, in a process shown in FIG. 14C, a light curing material 45y is applied on the light shielding part 45b. As a material for the light curing material 45y, for example, SU-8 of a negative type photo resist is available. The SU-8 hardens by light of a wavelength less than or equal to 400 nm, and has a high permeability to visible light. For application of the material, a spin coat method, spray coat method and the like are available. Also, it is possible to provide a process that evaporates solvent by a heat treatment process and so on after the application. Or, it is possible to apply a thicker film by repeating the application and heat treatment processes plural times.

Figure 14D:
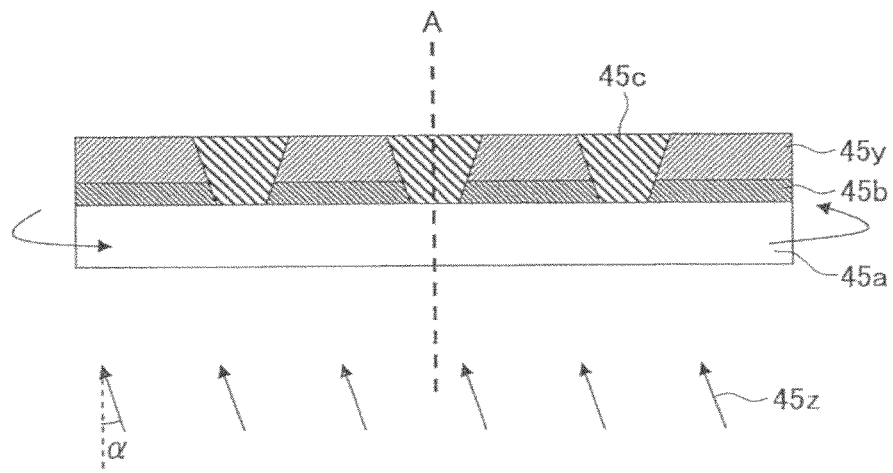
FIG. 14D is a fourth diagram illustrating a taper rod array manufacturing method.

Next, in a process shown in FIG. 14D, ultraviolet light 45z of approximately parallel light is emitted onto the applied light curing material 45y tilted at a predetermined angle α to a thickness direction of the light shielding part 45b (i.e., in a dotted line A direction). Furthermore, during exposure, the transparent substrate 45a is turned around the dotted line A. This makes the exposed part a tapered rod 45c.

Figure 14E:
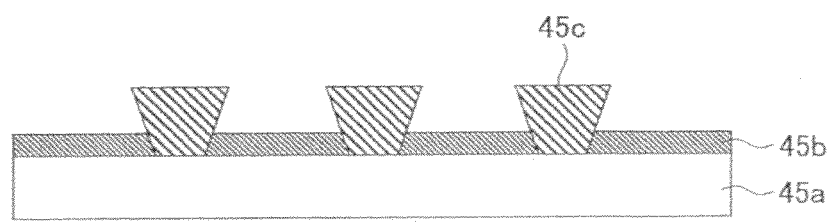
FIG. 14E is a fifth diagram illustrating a taper rod array manufacturing method.

Next, in a process shown in FIG. 14E, by rinsing parts that are not irradiated with the light of the light curing material 45y away by developer and rinse including a predetermined solution, only the tapered rods 45c, exposed parts in the process shown in FIG. 14D, remain. This way, the tapered rods 45c are formed together on the light shielding part 45b in the end.

Figure 15:
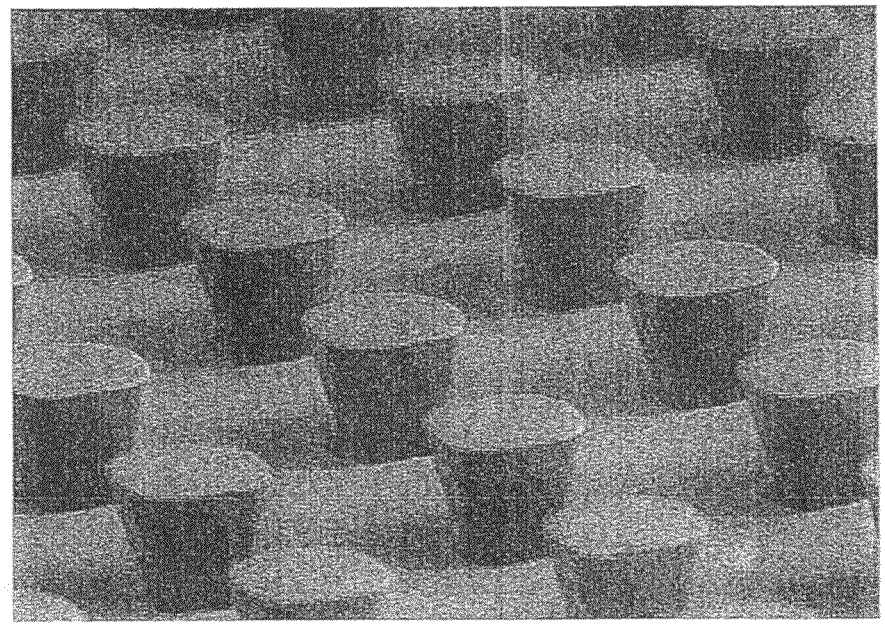
FIG. 15 is a diagram illustrating an optical device manufactured by the manufacturing method shown in FIG. 14.

FIG. 15 is a view illustrating an optical device actually manufactured by the manufacturing method shown in FIG. 14A through FIG. 14E. FIG. 15 is an image of the optical device taken by a scanning electron microscope from an angle. A ground is a silver film forming the light shielding part 45b, and it turns out that a tapered rod array structure of SU-8 resist is formed at an opening part of the silver film. As the device used for the spectral characteristic obtaining apparatus of the present invention, a row of tapered rod array made by dicing the optical device manufactured as shown in FIG. 15 can be used.

In this manner, the fourth embodiment has not only similar advantages to the first embodiment but also the following advantages. That is, the spectral characteristic obtaining apparatus of the fourth embodiment includes at least the pinhole array, the imaging optical system and the diffraction grating as a spectroscopic optical system. As a result, it is possible for the diffraction grating to diffract outgoing light from the slits that constitute the pinhole array, and to lead lights with different wavelength distributions to the N pixels of the line sensor. This makes it possible to realize a high-speed and high-accuracy spectral characteristic obtaining apparatus that does not need an alignment.

In addition, the spectral characteristic obtaining apparatus of the fourth embodiment includes a second imaging optical system that forms an image of the reading object on the pinhole array. As a result, it is possible to limit light incident on the slits of the pinhole array to light that diffuses from a certain area in the reading object, and to realize a spectral characteristic obtaining apparatus that has a higher special resolution of an object area that each of the spectroscopic sensors measures.

Fifth Embodiment

Figure 16:
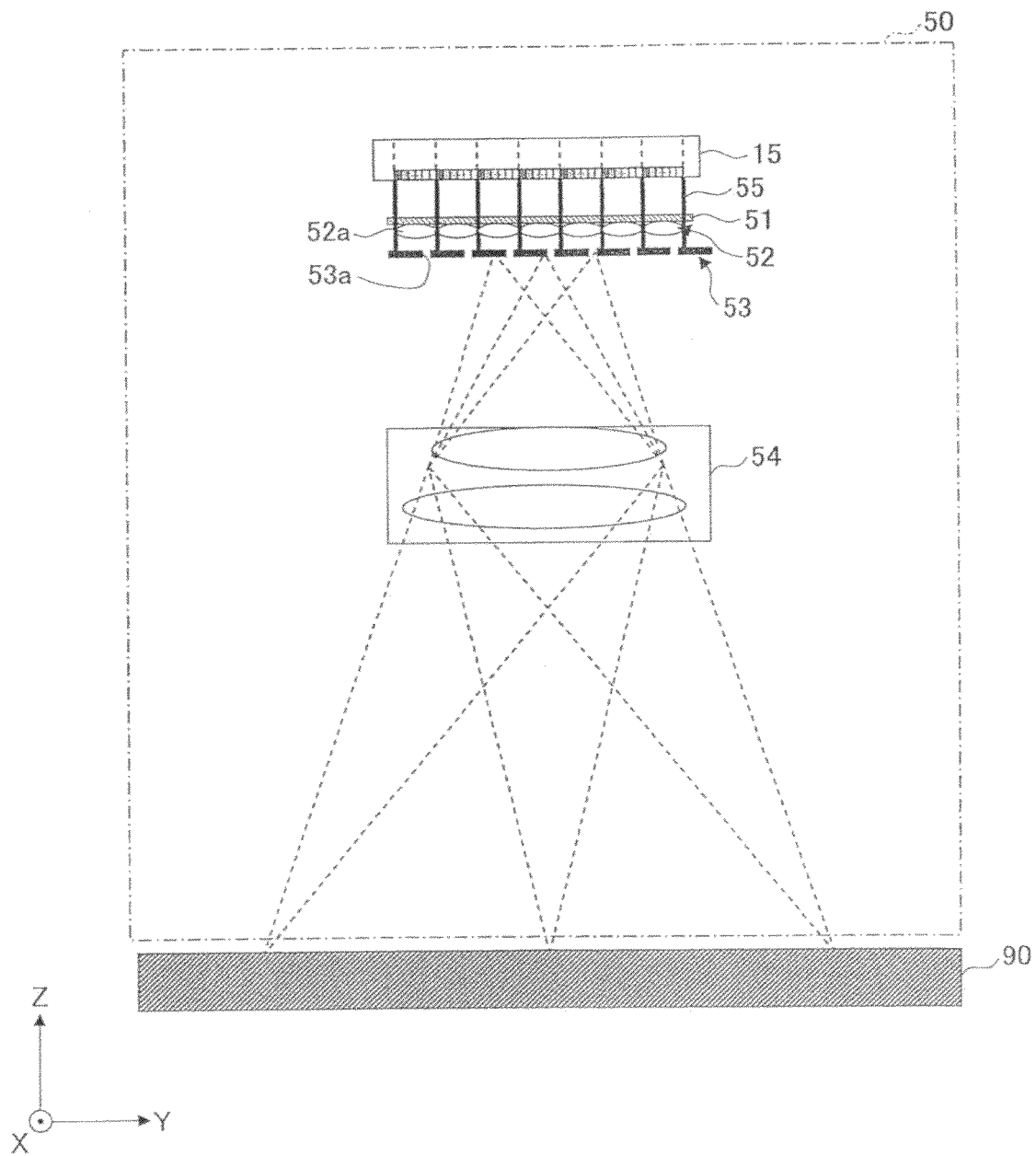
FIG. 16 is a diagram illustrating a fifth embodiment of a spectral characteristic obtaining apparatus of the present invention.
Figure 17:
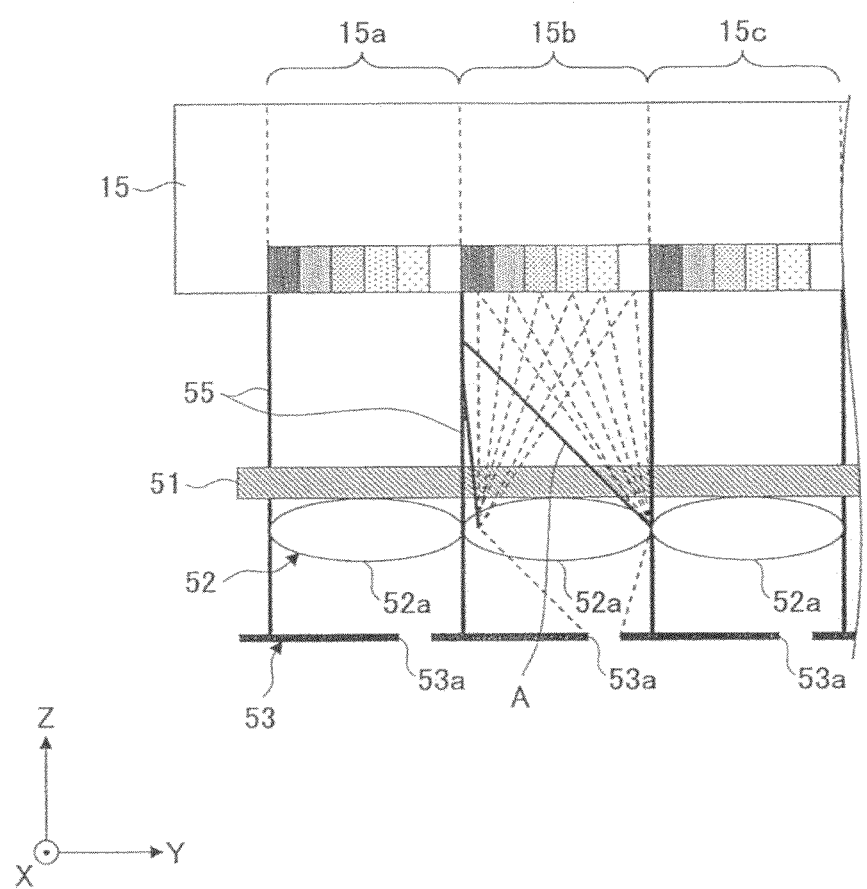
FIG. 17 is a diagram illustrating an enlarged frame format of a part of FIG. 16.

In a fifth embodiment, a spectral characteristic obtaining apparatus different from the first embodiment is shown. FIG. 16 is a diagram illustrating a spectral characteristic obtaining apparatus of the fifth embodiment. FIG. 17 is an enlarged simulation diagram illustrating a part of FIG. 16. In FIG. 16 and FIG. 17, the same numerals may be used for the same components as those in FIG. 1, and an explanation about the components may be omitted. Referring to FIG. 16 and FIG. 17, the spectral characteristic obtaining apparatus includes a line illumination light source 11, a collimating lens 12, a line sensor 15, a diffraction grating 51, a lens array of a first imaging unit, a pinhole array 53, an imaging optical system 54 of a second imaging unit and a light shielding wall 55.

Here, in FIG. 16 and FIG. 17, an illumination optical system (i.e., the line illumination light source 11 and the collimating lens 12) is not shown, the spectral characteristic obtaining apparatus of the fifth embodiment includes the same illumination optical system as that described in FIG. 1, which emits light from a depth direction of the paper plane (i.e., X direction in FIG. 16 and FIG. 17).

Dotted lines in FIG. 16 shows typical light paths of diffused reflected lights from an image holding medium 90 in a simulating way. An image on the image holding medium 90 is formed as an image on the pinhole array 53 by the imaging optical system. Then, the image on the pinhole array is formed as an image on a pixel of the line sensor 15 after being separated into a spectrum by the lens array 52 and diffraction grating 51. A diffraction grating similar to the diffraction grating 41 described in FIG. 9 and FIG. 10 can be used for the diffraction grating 51.

As the dotted line in FIG. 17 shows the light paths, each lens 52a that constitutes a lens array 52 is respectively provided corresponding to each slit 53a that constitutes the pinhole array 53, and the light that has passed through the slit 53a, lens 52a and diffraction device 51 is separated into a spectrum and led to N pixels of the line sensor 15.

The light shielding wall 15 is provided between the adjacent spectroscopic sensors 15a, 15b to minimize non-diffraction light (zero order light) A incident on the line sensor 15. In FIG. 17, since a center of each of the slits 53a that constitute the pinhole array 53 is not coincident with a center axis of each of the lenses 52a that constitute lens array 52 (which means eccentricity), the non-diffraction light (zero order light) A shown by solid lines hits the light shielding wall 55. With this, it is possible to minimize the non-diffraction light (zero order light) A incident on the line sensor 15.

In this way, the lens array 52, pinhole array 53 and light shielding wall 55 constitute a typical example of an unnecessary light shielding unit of the preset invention. Here the light shielding wall 55 is not an essential composition element. If the non-diffraction light (zero order light) A enters the line sensor 15, the non-diffraction light (zero order light) A becomes noise content and deteriorates signals, but the non-diffraction light (zero order light) A can be shielded by providing the light shielding wall 55.

In this manner, the fifth embodiment has not only advantages similar to the first embodiment but also the following advantages. That is, the spectral characteristic obtaining apparatus of the fifth embodiment can realize a spectral characteristic obtaining apparatus with a higher accuracy by including the unnecessary light shielding unit that shields the light that is not diffracted by the diffraction device (i.e., the unnecessary light) and can cause the noise.

In addition, by disposing the diffraction device so that a diffraction direction of the diffraction device does not become parallel to a pixel array direction of the line sensor 15, it is possible to allow only one degree of light to enter the line sensor 15. As a result, incidence of the light that can cause noise on the line sensor 15 decreases, and thus it is possible to provide a spectral characteristic obtaining apparatus with a higher accuracy.

Sixth Embodiment

In a sixth embodiment, an explanation is given about a method that shields the diffraction light other than a desired degree in the spectral characteristic obtaining apparatus 40 of the fourth embodiment and the spectral characteristic obtaining apparatus 50 of the fifth embodiment. Hereinafter, an explanation is omitted about a common part to the fourth embodiment and the fifth embodiment, a different part from the fourth embodiment and the fifth embodiment is mainly explained.

FIG. 18 is a photograph showing light incident on the line sensor 15 seen from the incident plane. FIG. 18 shows an example where the diffraction device 41 or 51 is disposed so that a diffraction direction of the diffraction device 41 or 51 becomes parallel to a pixel array direction of the line sensor 15 (i.e., Y direction) in a plane perpendicular to a light axis (i.e., Z axis) of a whole optical system (i.e., XY plane). In the example of FIG. 18, a diffraction image of the non-diffraction light (i.e., zero order light), the + second order light D, the − second order light and adjacent light beams that have gone through adjacent openings overlap on the line sensor 15 and generate a cross talk, which makes it difficult to obtain an exact spectral characteristic.

Hence, to shield the non-diffraction light (i.e., zero order light) and the other diffraction light except a desirable degree, it is desirable that the diffraction device is disposed so that the diffraction direction of the diffraction device 41, 51 does not parallel to the pixel array direction of the line sensor 15 (i.e., Y direction) in a plane perpendicular to the light axis (i.e., Z direction) of the whole optical system (i.e., XY plane) (i.e., so as to have a predetermined angle to a pixel array direction of the line sensor 15). An explanation is given about this, using FIG. 10 through FIG. 23 below.

Figure 19:
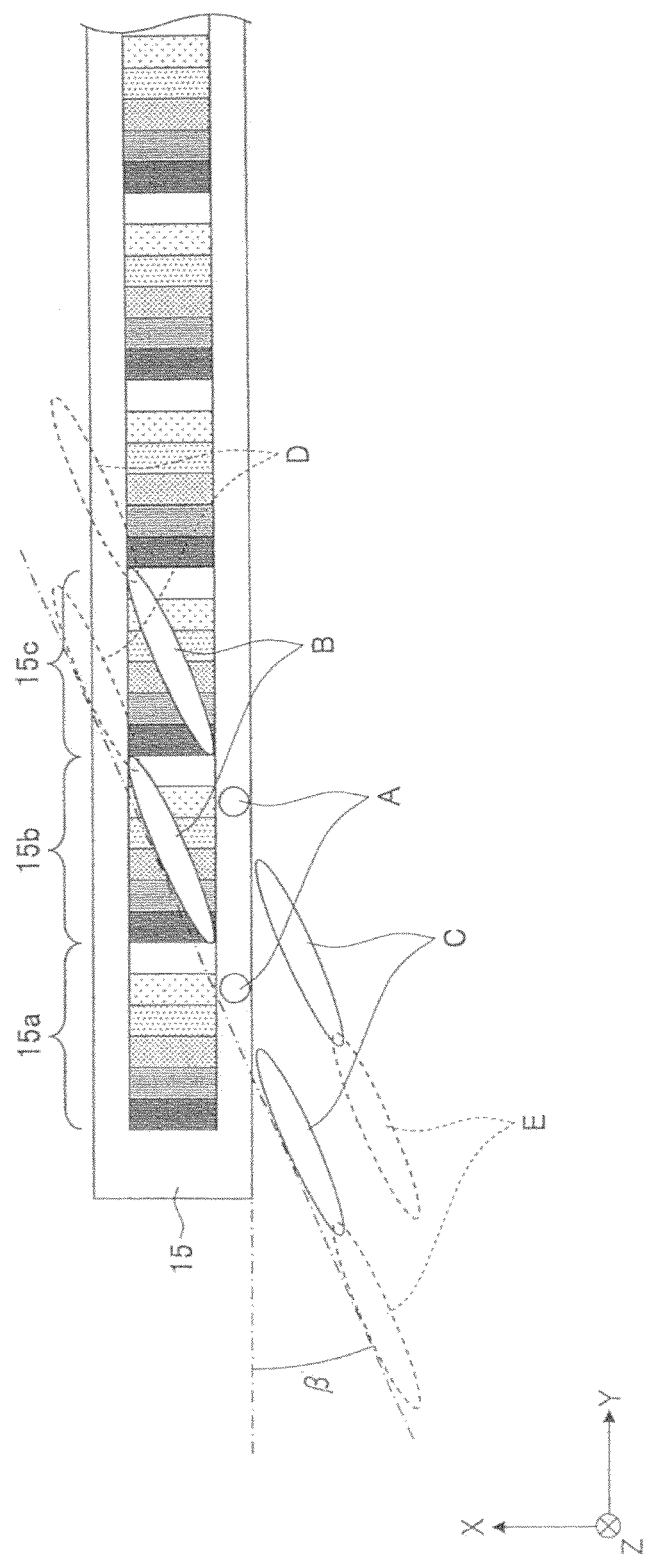
FIG. 19 is a first diagram to explain an arrangement of a diffraction grating.
Figure 20:
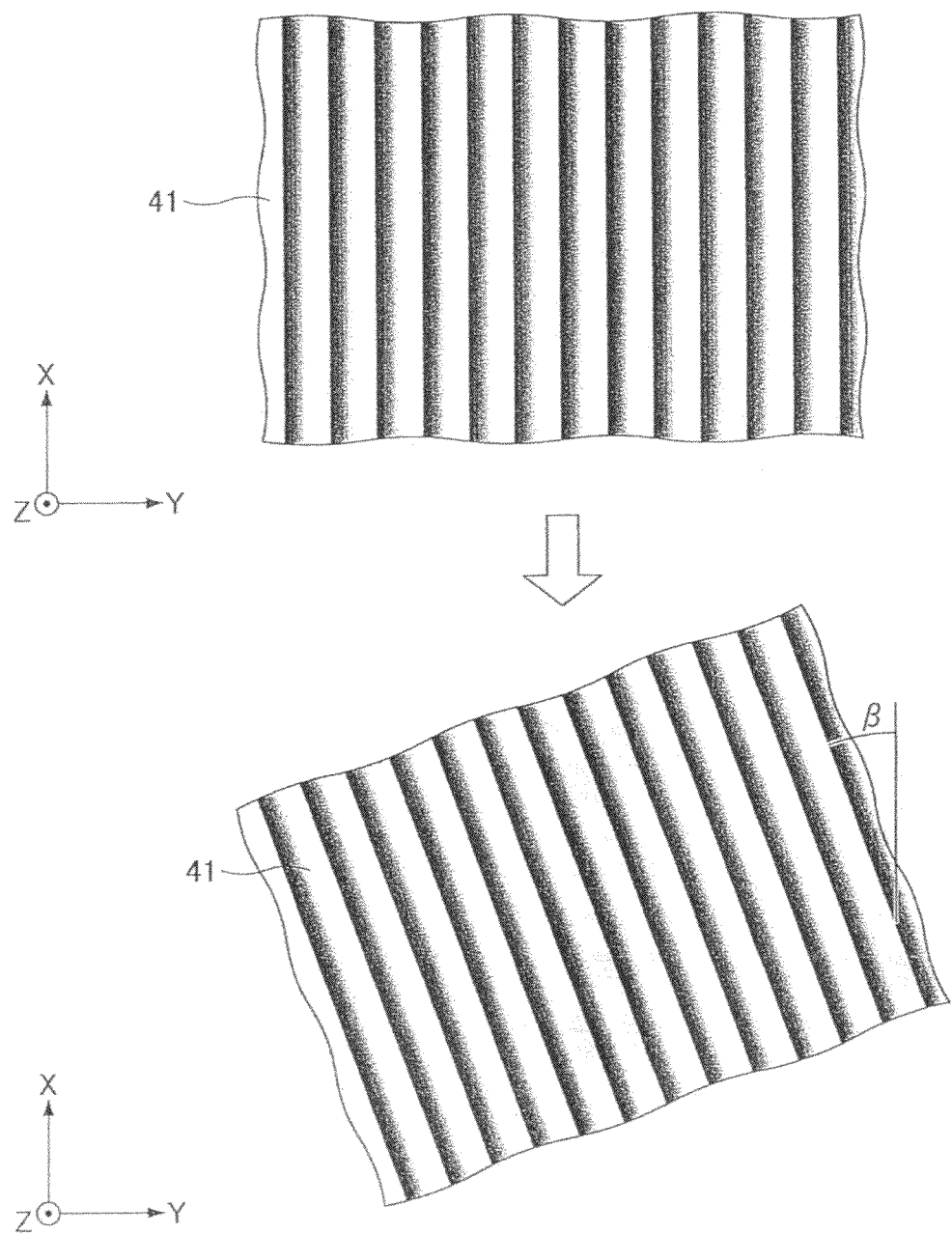
FIG. 20 is a second diagram to explain an arrangement of a diffraction grating.

FIG. 19 is a diagram to explain an arrangement of the diffraction device and shows the line sensor 15 and light incident on the line sensor 15 seen from an incident surface side. As shown in FIG. 19, to shield a diffraction light other than + first order light B of a desired diffraction light, it is desirable that the diffraction device is disposed so that the diffraction direction of the diffraction device 41, 51 does not become parallel to N pixel array direction of the line sensor 15 (i.e., Y direction) in a plane perpendicular to a light axis (i.e., Z axis) of a whole optical system (i.e., XY plane) (i.e., so as to have a predetermined angle to N pixel array direction of the line sensor 15).

In FIG. 19, as light to pass the diffraction device, − first order light C, + second order light D, − second order light E and the like that have a weaker intensity than the non-diffraction light (i.e., zero order light) and + first order light B, but are not desired diffraction light, other than the + first order light B, the desired diffraction light. As shown in FIG. 19, the diffraction direction of the diffraction device is inclined at a minute angle β in a X direction to a pixel array direction of the line sensor 15 (i.e., Y direction) in the plane perpendicular to the light axis (i.e., Z direction) of the whole optical system (i.e., XY direction). On this occasion, the minute angle β is needed to be determined to be an angle so that a certain + second order light D does not enter the same pixel as that the adjacent plus degree light enters.

To tilt the diffraction direction as shown in FIG. 19, for example, it is only necessary to rotate the whole diffraction device 41 as shown in FIG. 10 by only the minute β degree to the X axis in the XY plane perpendicular to the light axis (i.e., Z direction) of the whole optical system. Also, it is possible to slant grates of the diffraction device 41 by only the minute degree β to the X axis in the XY plane perpendicular to the light axis (i.e., Z direction) of the whole optical system without rotating the whole diffraction grating 41. This makes it possible to make an arrangement where the + first order light B of the desired diffraction light enters the pixels of the line sensor 15 but the non-diffraction light (i.e., zero order light), − first order light C, + second order light D and − second order light E of undesired diffraction light hardly enter the pixels.

An explanation is given about an example of how to determine the minute angle β below. The angle β is needed to be determined so that only the + first light B of the desired light is emitted onto one of the spectroscopic sensors 15a, 15b, 15c, . . . , and the undesired non-diffraction light (i.e., zero order light) A, − first order light, + second order light, − second order light and the like are emitted outside the spectroscopic sensors 15a, 15b, 15c, . . . . However, the value of the angle β is not determined uniquely because of dependence upon optical layout. For example, the value of the angle β is determined by a height h and a width c of each of the pixels of the line sensor 15 shown in FIG. 21, and a distance s between the diffraction grating 41 and the line sensor 15, an angle θm of the diffraction light that forms an image on a light receiving surface, a magnification of the imaging optical system 42 and the like shown in FIG. 22.

Figure 22:
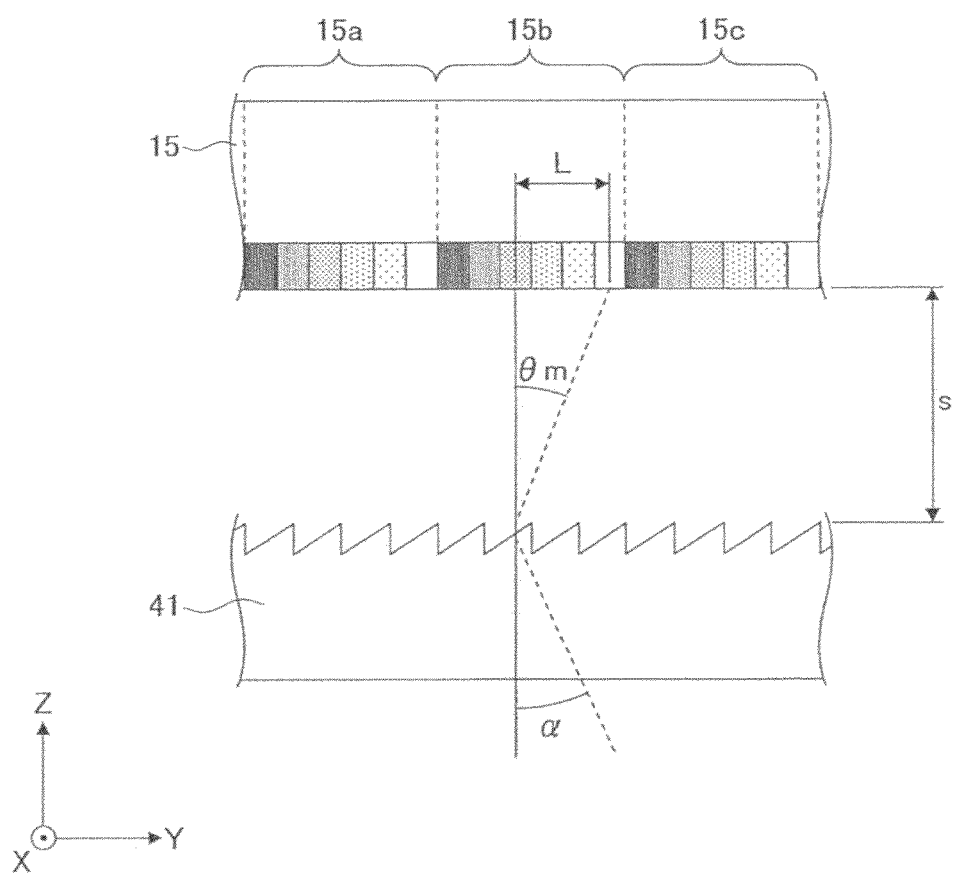
FIG. 22 is a fourth diagram to explain an arrangement of a diffraction grating.

To determine the angle β, to begin with, it is necessary to derive imaging positions of the respective wavelengths lights (see FIG. 22). The imaging position L is derived from a formula of L=s×tan θm. Here the angle θm (see FIG. 22) is an angle between each of the diffraction light and the Z axis (i.e., the axis of the whole optical system), derived from the formula (1). Because the angle β differs with respect to each of the wavelengths, the imaging position L also differs with respect to each of the wavelengths. Accordingly, by obtaining each of the imaging positions L of the both ends Bs, Be of the diffraction image by the + first order light B, a width of the diffraction image of the + first order light.

Considering the diffraction image of the + first order light and the non-diffraction image (i.e., zero order light) A are adjacent, so that the diffraction image of the + first order light B with a width j is emitted onto one of the spectroscopic sensors 15a and the like (whose pixel number equals to N), and the diffraction image of the unnecessary diffraction light (i.e., zero order light) A is emitted onto outside of the spectroscopic sensors 15a and the like, it is only necessary to obtain the height and width of each of the pixels and the number of the pixels of the spectroscopic sensor 15a and the like.

In other words, it is only necessary for a relationship between the width j of the diffraction image of the + first order light B, the height h and width c of each of the pixels of the line sensor 15, and the pixel number N of the spectroscopic sensor 15a and the like, to express a formula (2) and a formula (3).

$$j \sin \beta = h \quad (2)$$

$$j \cos \beta = N \times c \quad (3)$$

A formula (4) is derived from the formula (2) and (3).

$$\tan \beta = h/(N \times c) \quad (4)$$

The angle β is determined as a formula (5).

$$\beta = \tan^{-1}(h/(N \times c)) \quad (5)$$

Since the height h and width c of each of the pixels in the line sensor 15 are generally determined by the line sensor 15, the angle β can be obtained by the formula (5) after determining a necessary number of the pixels N, based on those values.

However, though it is restrictive, it is possible to determine the height h of each of the pixels of the line sensor 15 after determining the angle β. In this case, for example, what is called a "TDI (Time Delayed Integration) line sensor", a line sensor that can adjust the height of each of the pixels, is used. It is possible to determine the angle β first, then to adjust the height h of each of the pixels of the TDI line sensor, and to determine using pixel number N.

FIG. 23 is a photograph showing light incident on a line sensor seen from an incident surface side. More specifically, FIG. 23 shows an example of a case where the angle β is obtained by formula (5), the diffraction device 41 or 51 is disposed so that a diffraction direction of the diffraction device 41 or 51 has the minute angle β (which equals ten degrees) to the N pixel array direction of the line sensor 15 (i.e., Y direction) in the plane perpendicular to the light axis (i.e., Z direction) of the whole optical system (i.e., XY plane). As shown in FIG. 23, by setting the angle β at a predetermined value, preventing the stroke as shown in FIG. 18 is possible.

Figure 21:
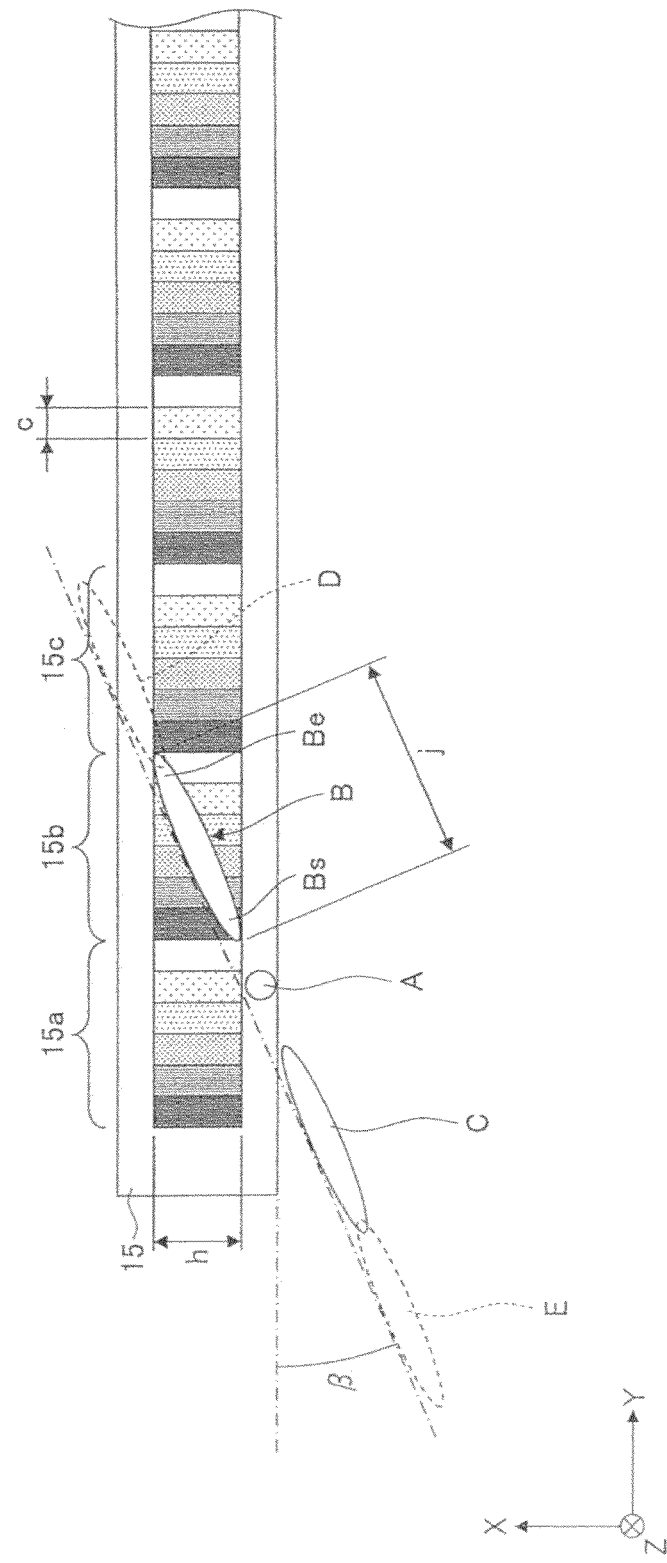
FIG. 21 is a third diagram to explain an arrangement of a diffraction grating.

The magnification of the imaging device 41 determines the width j of the diffraction image of the + first order light B on the light receiving surface of the line sensor 15 shown in FIG. 21. The width j of the diffraction image of the + first order light B, for example, is derived by directly receiving light from a white light source or by emitting a light flux from the white light source onto a white diffuser panel, and by detecting a diffraction image (i.e., receiving light amount of the line sensor 15) of the irradiated white light. That is, if diffraction efficiency is high enough, a light amount of the + second order light D is small enough to the + first order light B. Therefore, for example, it is possible to specify the pixel receiving the + first order light B by a digitalization processing that converts light received by the line sensor 15 into an electric signal, inputs the converted electronic signal into a circuit part including a CPU (i.e., Central Processing Unit) or a digital signal processor, and determines if a level of the input electric signal is more than or equal to a predetermined threshold value.

In this way, the sixth embodiment has not only the similar advantages to the fourth and fifth embodiments but also the following advantages. That is, according to the spectral characteristic obtaining apparatus of the sixth embodiment, by disposing the diffraction device of the diffraction unit so that the diffraction direction of the diffraction device have a predetermined angle (i.e., which does not become parallel) to the N pixel array direction of the line sensor in the plane perpendicular to the light axis of the whole optical system (i.e., Z direction), it is possible to make only the + first order light B of the desired diffraction light enter the line sensor. As a result, it is possible to reduce incidence of the light that can cause noise on the line sensor, and to provide the spectral characteristic obtaining apparatus with higher accuracy.

In other words, it is possible to obtain spectroscopic data of light diffused from a measurement object at a high speed and at high accuracy without generating an error by an alignment between colors. More specifically, it is possible to provide a spectral characteristic obtaining method and a spectral characteristic obtaining apparatus that can perform spectroscopic measurement across a full width with high accuracy even if a light propagation direction varies by an imaging lens and the like according to a position, and a width of the diffraction image formed as an image at each position on the light receiving device varies. Moreover, by appropriately utilizing the conditions of each of the optical devices that implement the spectroscopic measurement to ensure the accuracy of the spectroscopic measurement, and also by excluding factors that may cause to decrease the spectroscopic measurement accuracy by the conditions of respective optical devices, it is possible to precisely obtain spectroscopic information of the full width of an image of the measurement object at one time.

Seventh Embodiment

As shown in FIG. 9, it becomes possible to form an image on the line sensor 15 from the diffused light from the full width of image by the imaging optical system. However, if the imaging optical system 42 is not a same magnification optical system, the diffused light from the full width of the image enters the spectroscopic device 41 at a different angle to the light axis (i.e., Z direction) from the imaging optical system, according to a position. Thus, the following problems occur.

Figure 24:
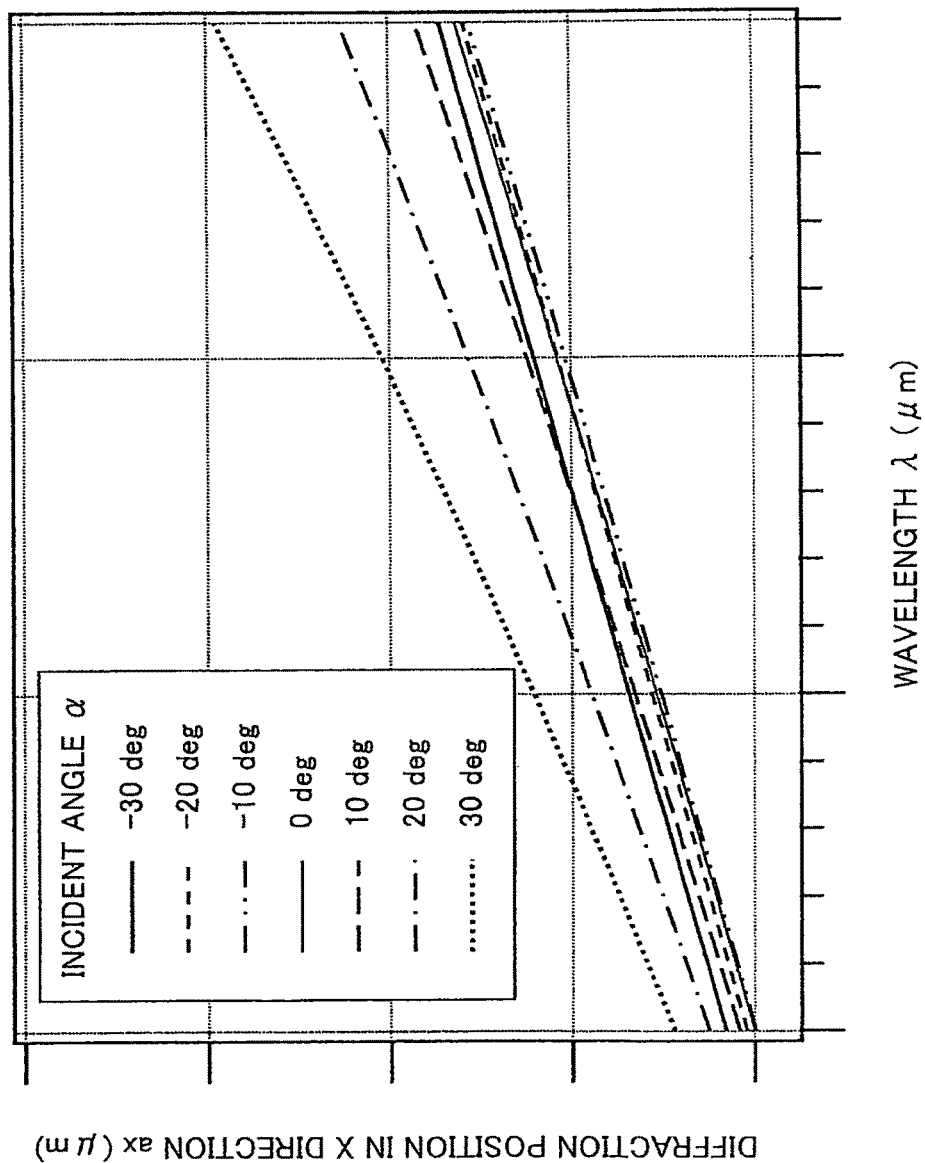
FIG. 24 is a diagram illustrating a relationship between an incident light wavelength λ and a diffracting position ax of a diffracting image by + primary light B in X direction.

FIG. 24 is a diagram illustrating a relationship between a wavelength λ of incident light and a diffraction position ax in X direction of a diffraction image of + first order light. In FIG. 24, when the diffraction position of the diffraction image of the + first order light B of the wavelength λ that equals 0.4 μm on the receiving surface of the line sensor 15 in X direction is set as an origin in FIG. 9, the diffraction positions ax of the incident light respective wavelengths in the X direction, making the incident angle α a parameter. As shown in FIG. 24, as the wavelength λ becomes longer, the variation of the diffraction position in the X direction caused by the difference of the incident angle increase.

Figure 25:
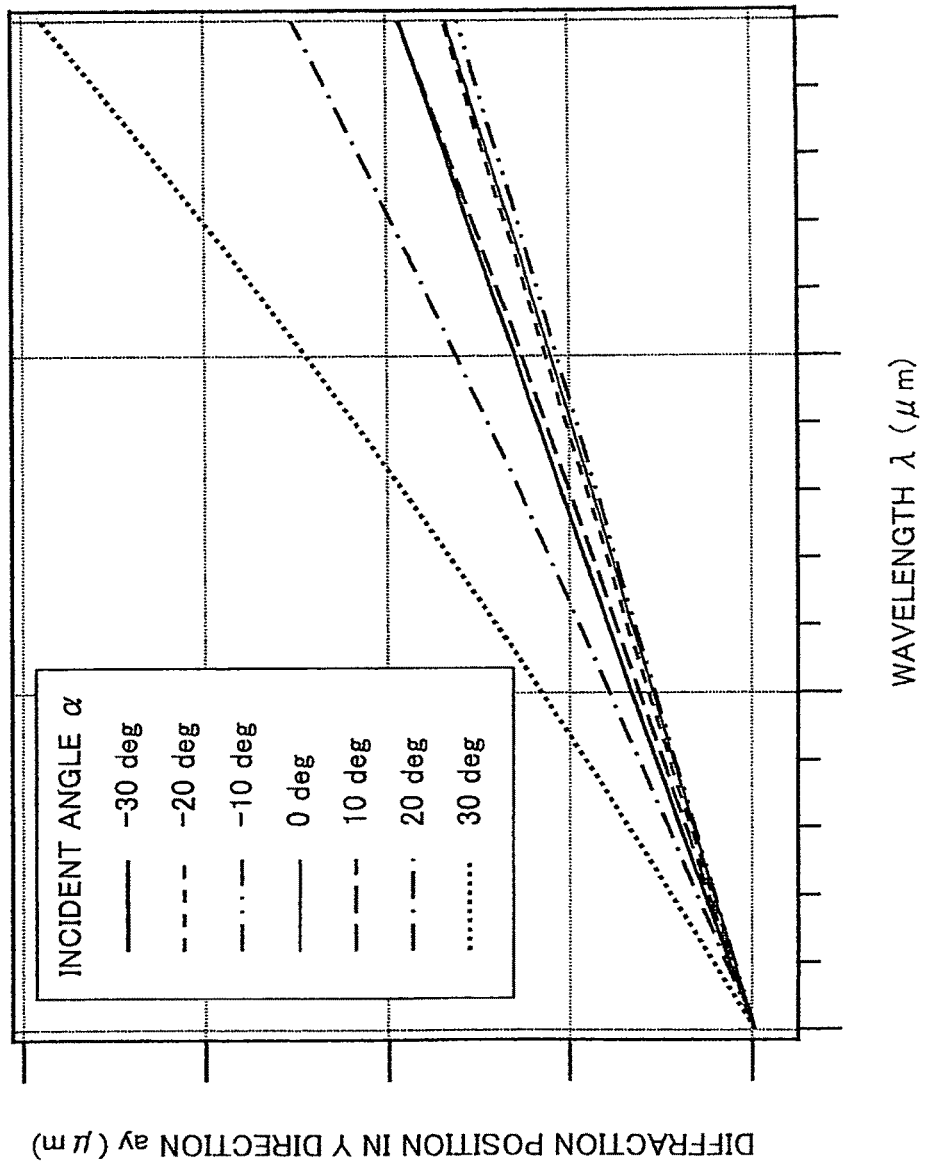
FIG. 25 is a diagram illustrating a relationship between an incident light wavelength λ and a diffracting position ay of a diffracting image by + primary light B in Y direction.

FIG. 25 is a diagram illustrating a relationship between a wavelength λ of the incident light and a diffraction position ay in Y direction of the diffraction image of the + first order light B. In FIG. 25, when the diffraction position of the diffraction image of the + first order light B of the wavelength λ that equals 0.4 μm on the receiving surface of the line sensor 15 in X direction is set as an origin in FIG. 9, the diffraction positions ax of the incident light respective wavelengths in the X direction, making the incident angle α a parameter. As shown in FIG. 25, as the wavelength λ becomes longer, the variation of the diffraction position in the Y direction caused by the difference of the incident angle increase. This shows that the width j of the diffraction image of the + first order light varies according to the imaging position on the light receiving surface of the line sensor 15 in the Y direction. In other words, this means that the width of the diffraction image of the + first order light that forms an image on the light receiving surface of the line sensor 15 at one end in the Y direction is wider than that at the other end. As is shown by comparison between FIG. 24 and FIG. 25, variation of the diffraction position in the X direction is larger than that in the Y direction.

Figure 26:
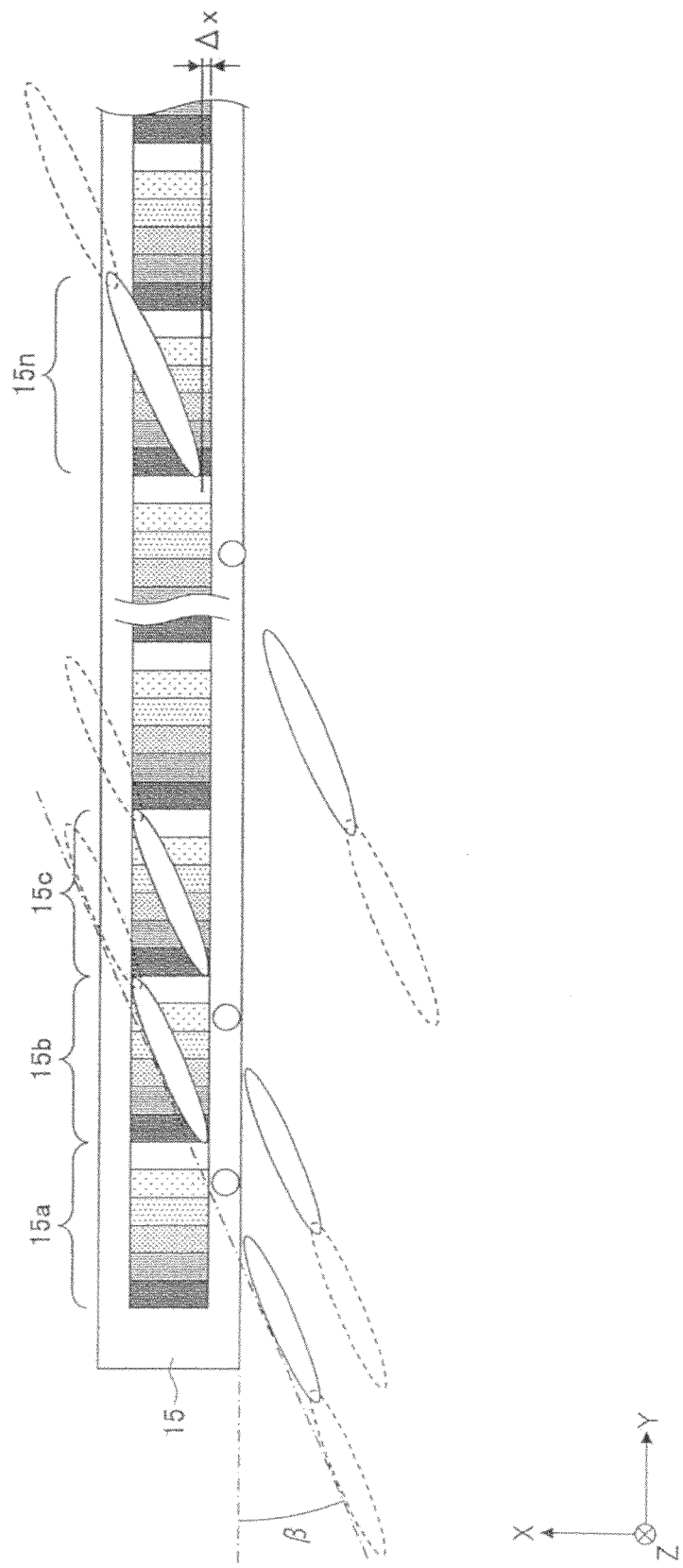
FIG. 26 is a fifth diagram to explain an arrangement of a diffraction grating.

More specifically, as shown in FIG. 26, the width of the diffraction image of the + first order light B in the nth spectroscopic sensor 15n is wider than that in the second spectroscopic sensor 15b, and the diffraction image of the + first order light B in the nth spectroscopic sensor 15n generates offset of only Δx to the diffraction image of the + first order light B in the second spectroscopic sensor 15b. The direction where the width of the diffraction image of the + first order light B broadens and the offset occurs varies according to a direction of an inclination of the diffraction grating 41.

Figure 27:
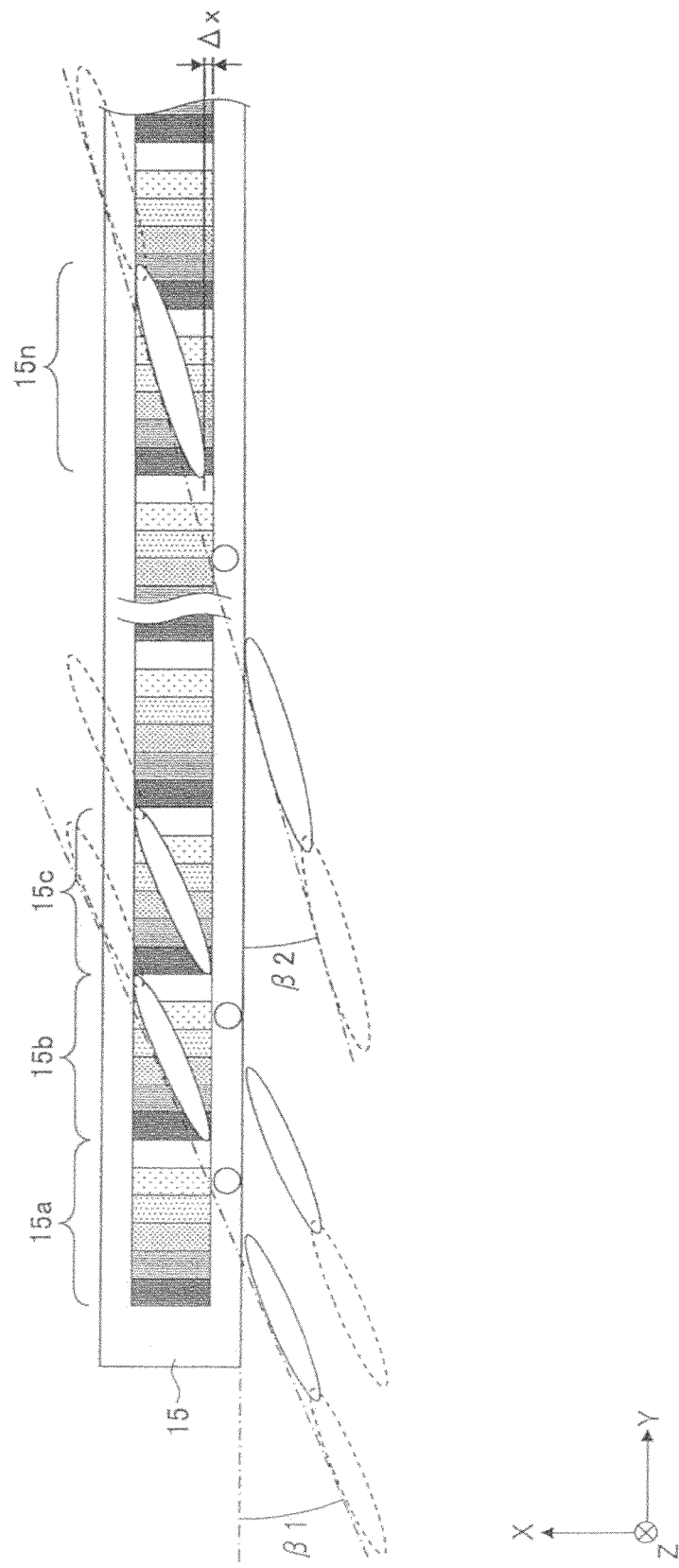
FIG. 27 is a sixth diagram to explain an arrangement of a diffraction grating.
Figure 28:
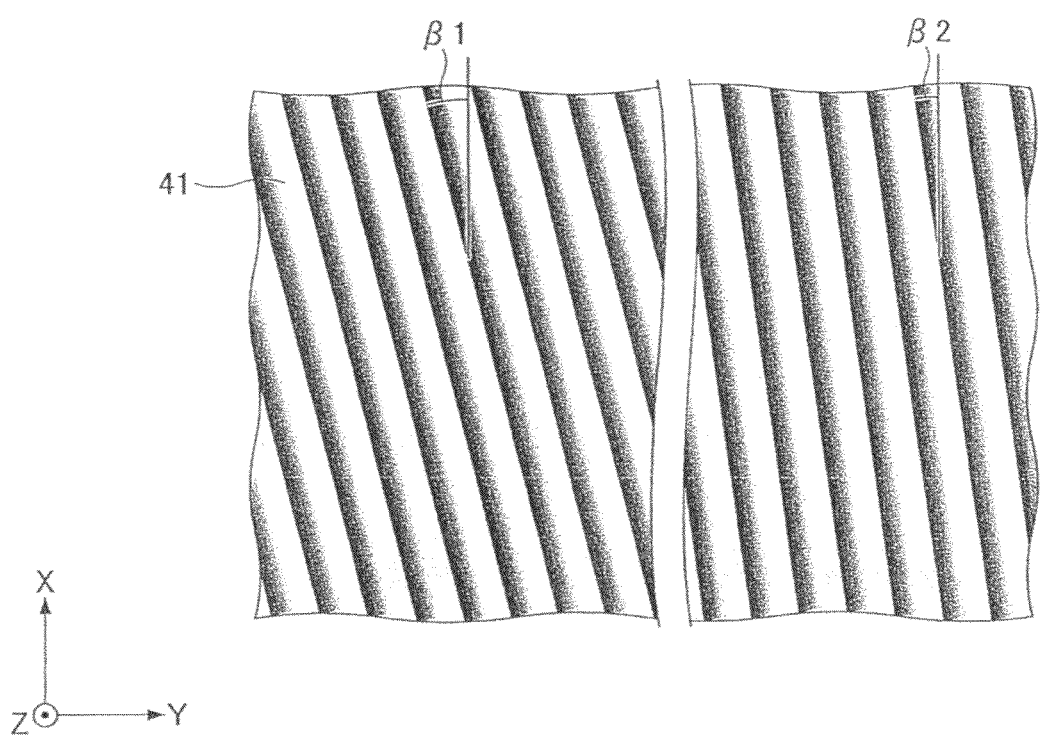
FIG. 28 is a seventh diagram to explain an arrangement of a diffraction grating.

In a case of FIG. 26, the nth spectroscopic sensor 15n cannot receive all of the + first order light B. However, as shown in FIG. 27, by setting the inclination angle β1 in the second spectroscopic sensor 15b and the inclination angle β2 in the nth spectroscopic sensor 15b at different values, it is possible for the nth spectroscopic sensor 15n to receive all of the + first order light B. To set the inclination angle β1 and β2 at different values, as shown in FIG. 28, it is only necessary to set the inclination of the diffraction grating 41 (i.e., the angle to the X axis) at partially different values. Moreover, it is also possible to gradually change the inclination angle (i.e., the angle to the X axis) of the diffraction grating from one end to the other end in the Y direction.

In a case of FIG. 27, because the width of the diffraction image of the + first order light B in the nth spectroscopic sensor 15n is wider than that in the second spectroscopic sensor 15b, the number of the pixels needed to receive the diffraction image of the + first order light B in the nth spectroscopic sensor 15n is more than that in the second spectroscopic sensor 15b and the like. In this way, the number of the pixels needed to receive the diffraction image of the + first order light B depends on a imaging characteristic at a position of the each of the spectroscopic sensors.

Accordingly, by setting the number of the pixels so as to correspond with the imaging characteristic of each of the spectroscopic sensors at a position in the Y direction, it is possible to obtain the diffraction image of the + first light B at the broadest width. The necessary number of the pixels is derived, for example, by directly receiving the light from the white light source or by emitting the light flux from the white light source onto the white diffuser plate, and by detecting the diffraction image of the irradiated white light (i.e., receiving amount of the line sensor 15). Namely, if the diffraction efficiency is high enough, the light amount of the + second order light D is small enough to the + first order light B. Therefore, for example, by the digitalization processing that converts the light received by the line sensor 15 into an electronic signal, inputs the converted electronic signal into a circuit part including a CPU and a digital signal processor, and determines if the input electronic signal level is more than or equal to a predetermined threshold value, it is possible to specify the pixels receiving the + first order light B and to set the necessary number of the pixels.

For example, in a case of FIG. 27, it is possible to determine that six numbers of the pixels are needed in the second spectroscopic sensor 15b and eight numbers of the pixels in the nth spectroscopic sensor 15n. Therefore, by the circuit part including the CPU and the digital signal processor, by setting the number of the pixels of the second spectroscopic sensor 15b at six, and the nth spectroscopic sensor 15n at eight, it is possible to obtain the diffraction image at each of the spectroscopic sensors at the broadest width. Here it is not necessary to preliminarily to determine that the first spectroscopic sensor 15a includes which pixel to which pixel and the nth spectroscopic sensor 15n includes which pixel to which pixel, it is only necessary to determine that a pixel where the light is detected is the first spectroscopic sensor 15a and the like.

Adjusting the number of the pixels of the spectroscopic sensors according to the position in the Y direction is also efficient when the inclination angle β equals zero. When the inclination angle β equals zero, the crosstalk as shown in FIG. 18 occurs, but the crosstalk can be reduced by the light shielding wall 55 in the fifth embodiment.

In this manner, the seventh embodiment has not only advantages similar to the fourth embodiment through the sixth embodiment but also the following advantages. That is, by setting the inclination of the diffraction grating at partially different values, and by adjusting the number of the spectroscopic sensors according to the position in the Y direction, it is possible to obtain the diffraction image of the + first order light at the broadest width even if the optical system is not the same magnification optical system.

Eighth Embodiment

Figure 29:
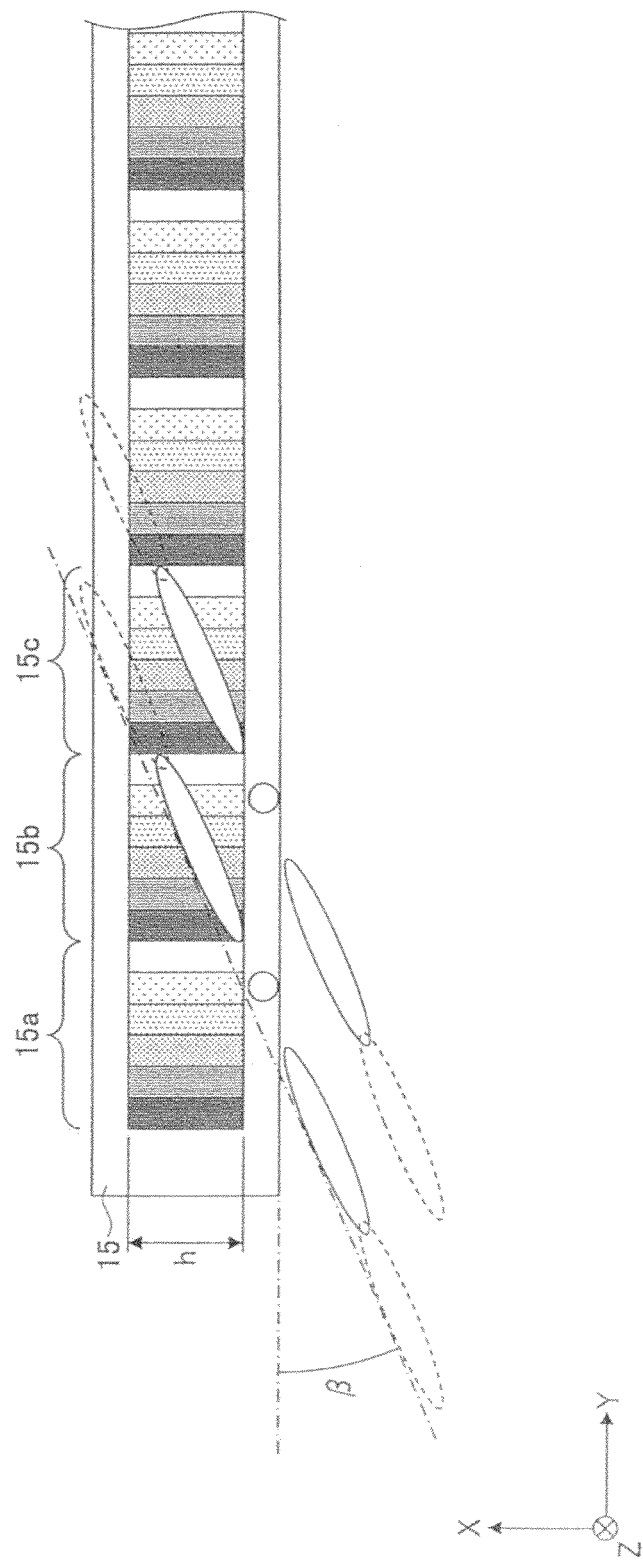
FIG. 29 is a first diagram to explain a light shielding wall.
Figure 30:
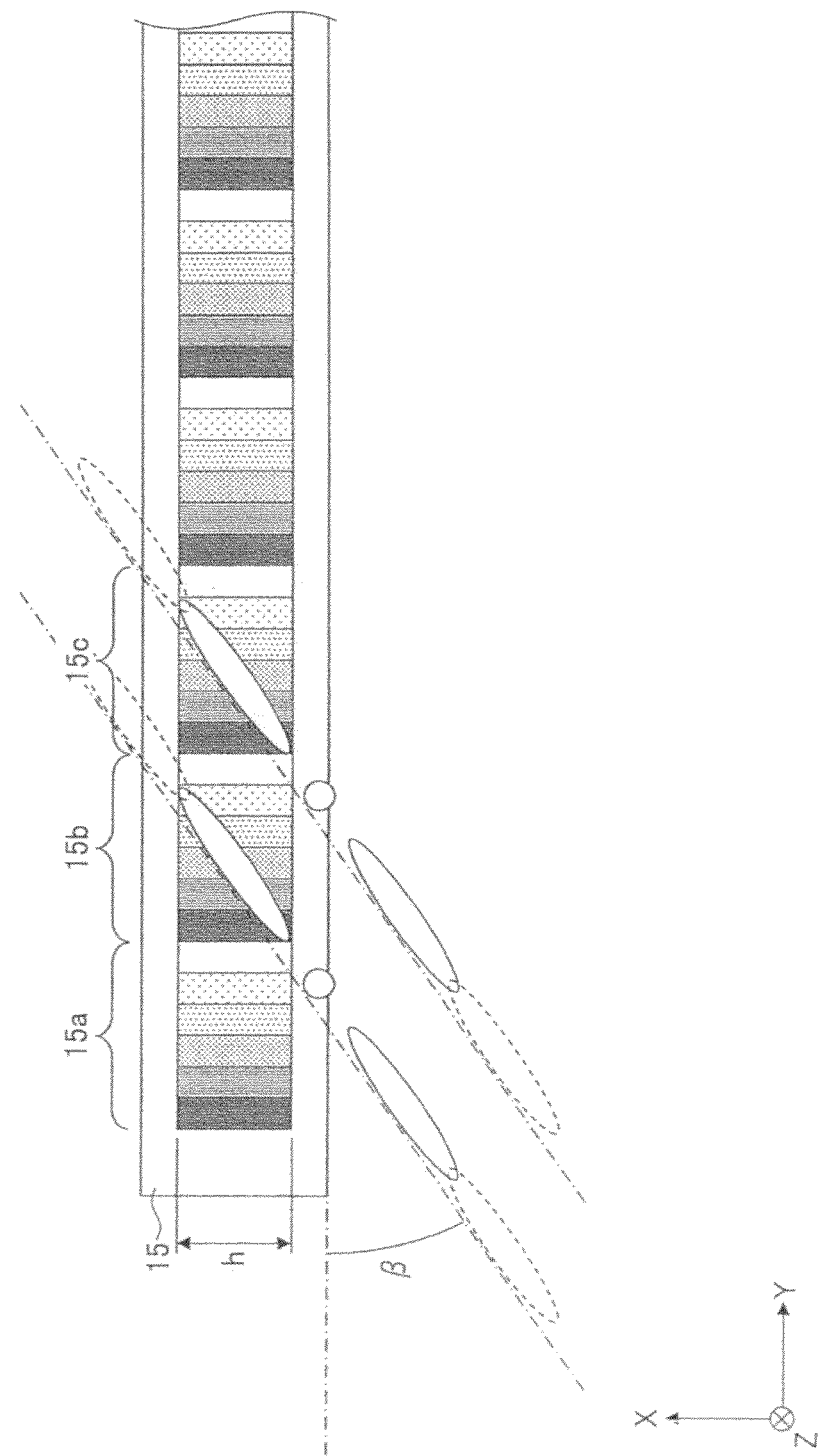
FIG. 30 is a second diagram to explain a light shielding wall.
Figure 31:
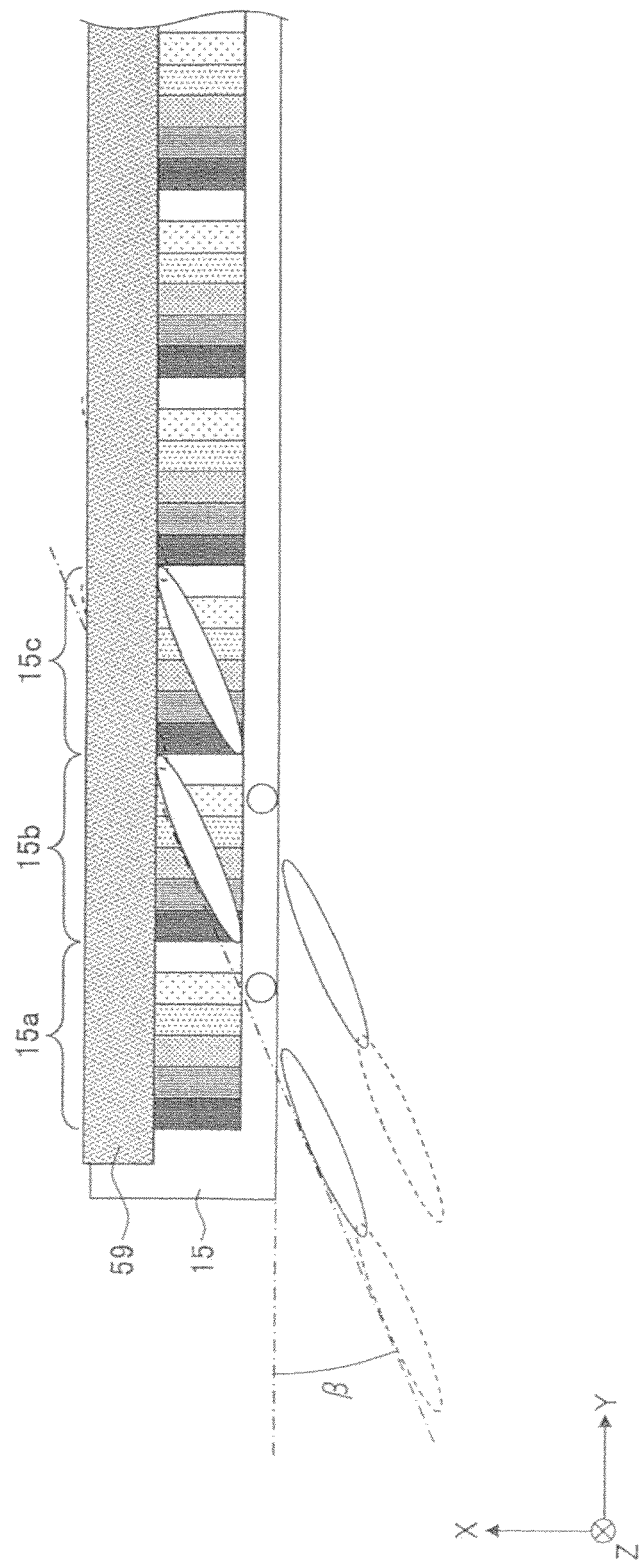
FIG. 31 is a third diagram to explain a light shielding wall.
Figure 32:
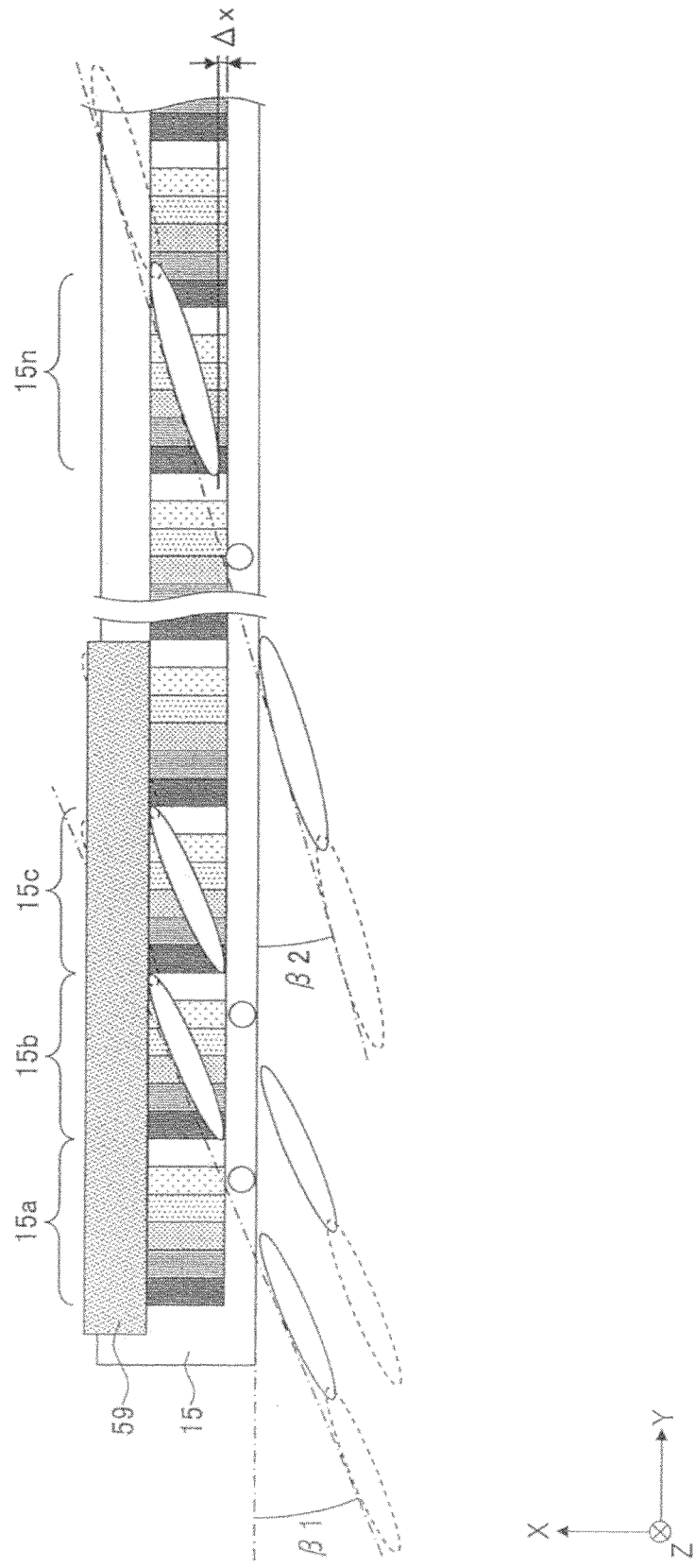
FIG. 32 is a fourth diagram to explain a light shielding wall.

For example, as shown in FIG. 29, if the height h of each of the pixels of the line sensor 15 is high, necessary number of pixels cannot be sometimes obtained by only inclining the diffraction grating (as described in below, the number of the pixels N is desired to be more than or equal to 6). In case of FIG. 29, the number of the pixels N becomes five if the diffraction grating 41 is further inclined as shown in FIG. 30, a requirement that the necessary number of the pixels N is more than or equal to 6 cannot be meet. Hence, as shown in FIG. 31, by providing a light shielding wall 59 that shields a part of the light receiving surface of the line sensor 15, exclusion of the + second order light D and the like that cause an error is carried out. A position where the light shielding wall 59 is provided can be obtained by designing, but, for example, is obtained by directly receiving the light from the white light source or by emitting the light flux from the white light source onto the white diffuser plate, and by detecting the diffraction image of the irradiated white light (i.e., light receiving amount of the line sensor 15). Namely, if the diffraction efficiency is high enough, the light amount of the + second order light D is small enough to the + first order light. Therefore, for example, by the digitalization processing method that converts the light received by the line sensor 15 into a electronic signal, inputs the converted electronic signal into the circuit part including the CPU and the digital signal processor and determines if the electronic signal level is more than or equal to a predetermined threshold value, it is possible to specify the pixels receiving the + first order light B. Based on the information, it is possible to set a position of the light shielding wall at the upper border position of the diffraction image of the + first order light B. Here, as shown in FIG. 32, the light shielding wall 59 may be also provided only in a part of an area on the light receiving surface of the line sensor 15.

By providing the light shielding wall 59, a method and apparatus that prevent the crosstalk of the diffraction image can be applied to a CCD area sensor of which imaging speed improves in the future or a CMOS area sensor and the like, and can respond to diversification of measurement scopes, measurement objects and the like. Here the light shielding wall 59 is a typical example of the light receiving height setting unit of the present invention.

In this way, the eighth embodiment has not only advantages similar to the fourth embodiment through the seventh embodiment but also the following advantages. That is, by providing the light shielding wall 59 that shields a part of the light receiving surface of the line sensor from the light, the necessary number of the pixels can be ensured, and the non-diffraction light (i.e., zero order light) and the diffraction light other than the desired order number can be blocked off.

Ninth Embodiment

In a ninth embodiment, there is provided an example of a spectral characteristic obtaining apparatus that includes a processing of estimation of a spectral distribution by suppressing the number of N to the minimum by an estimation unit such as Wiener estimation and the like.

In multi-band spectroscopic techniques, it is possible to obtain a more detailed measurement result of the spectral distribution as the number of N increases. However, the number of the pixels of the line sensor is constant, the number of the spectroscopic sensor capable of making an array decreases by increasing the number of N. Therefore, it is desirable for the spectral characteristic obtaining apparatus to suppress the number of N to the minimum and to include a processing of estimating the spectral distribution by the estimation unit such as the Wiener estimation (i.e., spectral estimation processing). A variety of methods are proposed regarding the spectral estimation processing. For example, "Analysis and Evaluation of Digital Color Image", University of Tokyo Press, Page 154 to 157 of non-patent literature gives details.

An example of an estimation method that estimates a spectral distribution from an output vi from a spectroscopic sensor is shown below. A row vector v that stores a signal output vi (I=1 to N) and a row vector r that stores spectral reflectivity of each of the wavelengths (e.g., 31 included at 10 nm pitch in 400 to 700 nm) from a conversion matrix G are expressed by formula (6).

$$r=Gv \qquad (6)$$

The conversion matrix G is obtained by minimizing a square norm $\|\cdot\|_2$ by using a least-squares method from the matrix R that stores the spectral distribution to many samples (i.e., N) of which spectral distribution is preliminarily known, and from the matrix V that stores v obtained when similar samples is measured by the present measurement apparatus.

$$R=[r1,r2,\ldots,rn] \qquad (7)$$

$$V=[v1,v2,\ldots,vn] \qquad (8)$$

$$e=\|R-GV\|2 \to \min \qquad (9)$$

The conversion matrix G is a regression coefficient matrix of a regression formula from the V to the R, making the V an explanatory variable and making the R an objective variable. The conversion matrix G is calculated as shown in formula (10), by using a generalization inverse matrix of Moore-Penrose that gives a square and least norm solution of the matrix V.

$$G=RV^T(VV^T)^{-1} \qquad (10)$$

Here a superscript T expresses transposition of a matrix, and a superscript −1 expresses an inverse matrix. By storing the conversion matrix G obtained here, and by calculating a product between the conversion matrix G and the signal output v, the spectral distribution of an arbitrary measurement object is estimated.

As an example, the spectroscopic sensor array of the embodiment read a toner image output by an electro photographic type image forming apparatus and estimated the spectral distribution. Then, simulation that calculates a color difference of an estimation error from the estimated spectral distribution was performed. In the simulation, the color difference (ΔE) between a color measurement result when the N value is changed and a color measurement result obtained by a more detailed spectral apparatus.

Figure 33:
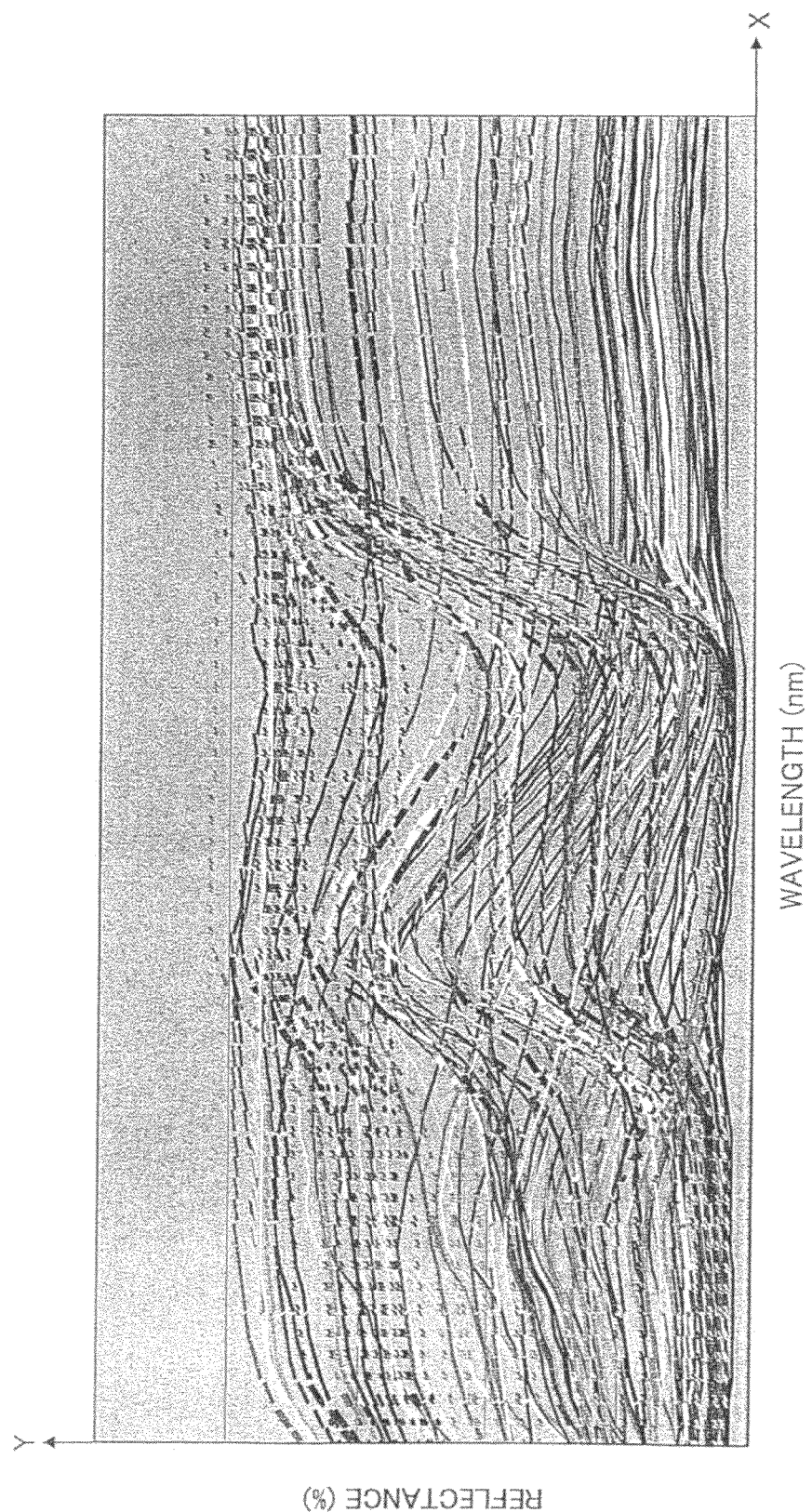
FIG. 33 is a diagram illustrating spectral distribution of a toner image used for a simulation.
Figure 34:
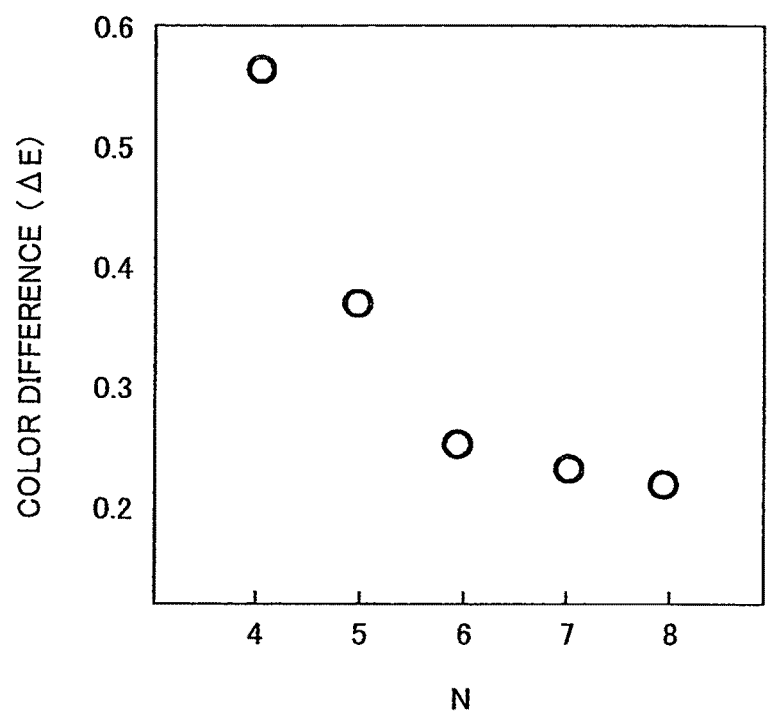
FIG. 34 is a diagram illustrating a simulation result.

FIG. 33 is a diagram illustrating a spectral distribution of the toner image used for the simulation. FIG. 34 is a diagram illustrating a simulation result. Referring to FIG. 34, it turns out that errors of the estimation value do not make a major difference when N is more than or equal to six. The result shows that the error of the estimation value is small enough and a desirable spectroscopic sensor array can be realized when the number of N is more than or equal to six in order to measure a color of an output result of an image forming apparatus such as a toner, while the result might not apply to every case since the result much depends on the reading object, the spectral distribution of the light signal that sensor receives and the like.

In this manner, the ninth embodiment has not only advantages similar to the first embodiment but also the following advantages. That is, the spectral characteristic obtaining apparatus of the ninth embodiment has the spectral characteristic estimation unit that estimates a wavelength distribution with a higher wavelength resolution and a higher density, based on outputs from the N pixels. As a result, for example, even if the number of N is around six in a visible wavelength range, it is possible to estimate an almost continuous spectral distribution.

In particular, if an image formed by an image forming apparatus is measured, it is possible to efficiently estimate an almost continuous spectral distribution when the N value is more than or equal to six, and to realize a spectral characteristic obtaining apparatus with high accuracy.

Tenth Embodiment

Figure 35:
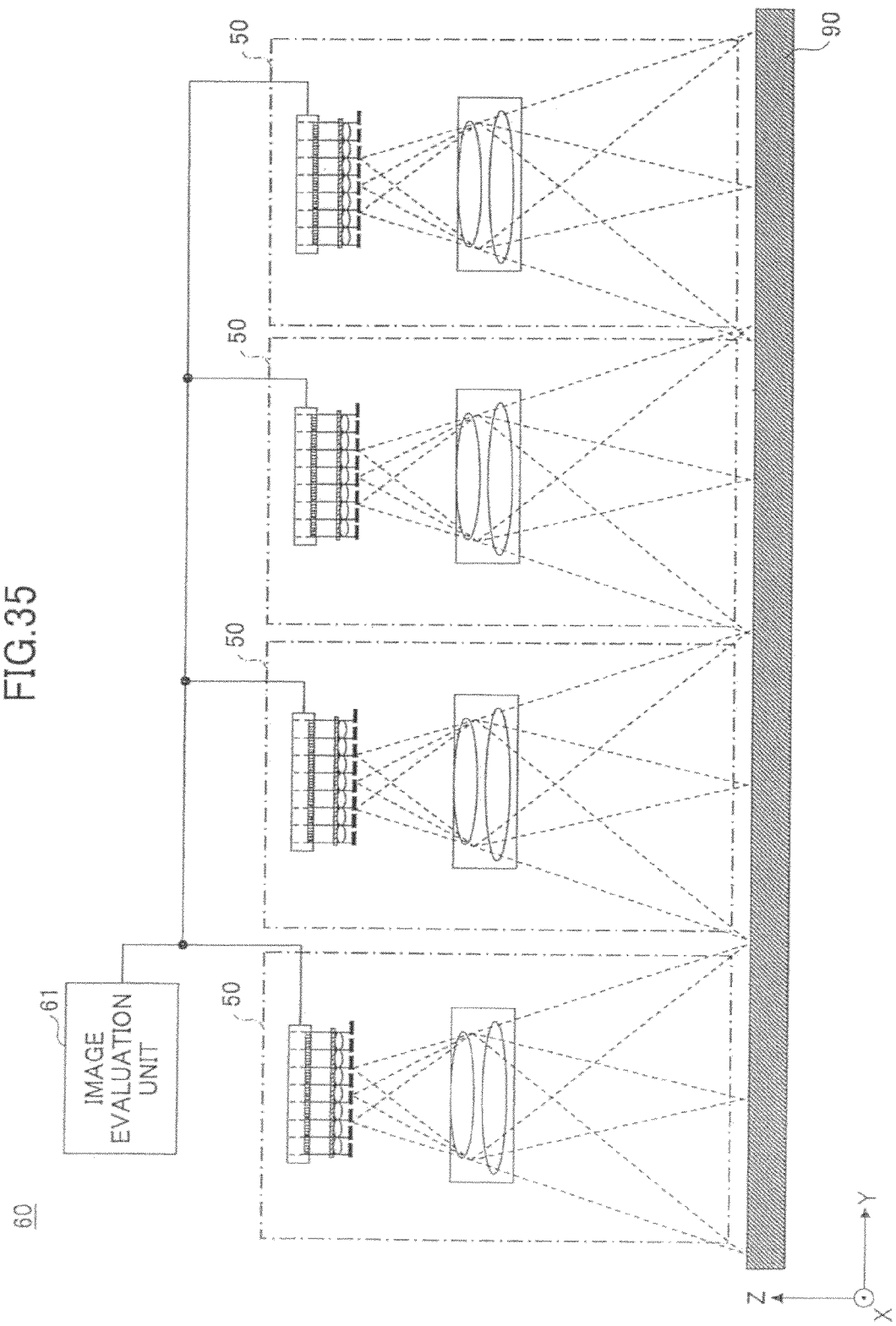
FIG. 35 is a diagram illustrating a tenth embodiment of an image evaluation apparatus of the present invention.

In a tenth embodiment, an example that constitutes an image evaluation apparatus by using plural spectral characteristic obtaining apparatuses is shown. FIG. 35 is a diagram illustrating the image evaluation apparatus of the tenth embodiment. Referring to FIG. 35, for example, the image evaluation apparatus 60 measures an image formed on an image holding medium 90 by an electro photographic type image forming apparatus across a full width. The image evaluation apparatus 60 is configured to include the plural spectral characteristic obtaining apparatuses 50 shown in FIG. 16 arranged in Y direction. By configuring the image evaluation apparatus 60 like this, a broader range of the spectral characteristic can be obtained.

Here in FIG. 35, though an illumination optical system (i.e., a line illumination light source 11 and a collimating lens 12) is not shown, the image evaluation apparatus 60 is configured to include the identical illumination optical system to the illumination optical system described in FIG. 1 that emits light from a depth direction of the paper plane (i.e., X direction) at oblique 45 degree. The same number of the illumination optical systems may be arranged in Y direction as the spectral characteristic obtaining apparatus 50, or less number of the illumination optical systems may be arranged in Y direction than the spectral characteristic obtaining apparatus 50, or only one illumination optical systems may be disposed.

The image evaluation apparatus 60 further includes an image evaluation unit 61 and a conveyance unit (which is not shown in FIG. 35). The image evaluation unit 61 has a function that calculates color measurement data such as XYZ or L*a*b by synthesizing outputs from the plural spectral characteristic obtaining apparatuses 50, and evaluates the colors of the image formed of plural colors on the image holding medium 90. The conveyance unit 89 (see FIG. 36) has a function that conveys the image holding medium 90 in X direction. Also, the image evaluation apparatus 60 can calculate spectral image data and the color measurement data of a whole surface of the image forming part on the image holding medium 90, based on speed information that is already known or obtained from an encoder sensor mounted on the conveyance unit 89 (see FIG. 36).

Here in the image evaluation apparatus 60, the spectral characteristic obtaining apparatuses 10, 20, 30, 40 may be used in place of the spectral characteristic obtaining apparatuses 50.

In this way, according to the tenth embodiment, by configuring the image evaluation apparatus, using the plural spectral characteristic obtaining apparatuses of the present invention, it is possible to realize an image evaluation apparatus that works at high speed and is not affected by a position gap.

Eleventh Embodiment

Figure 36:
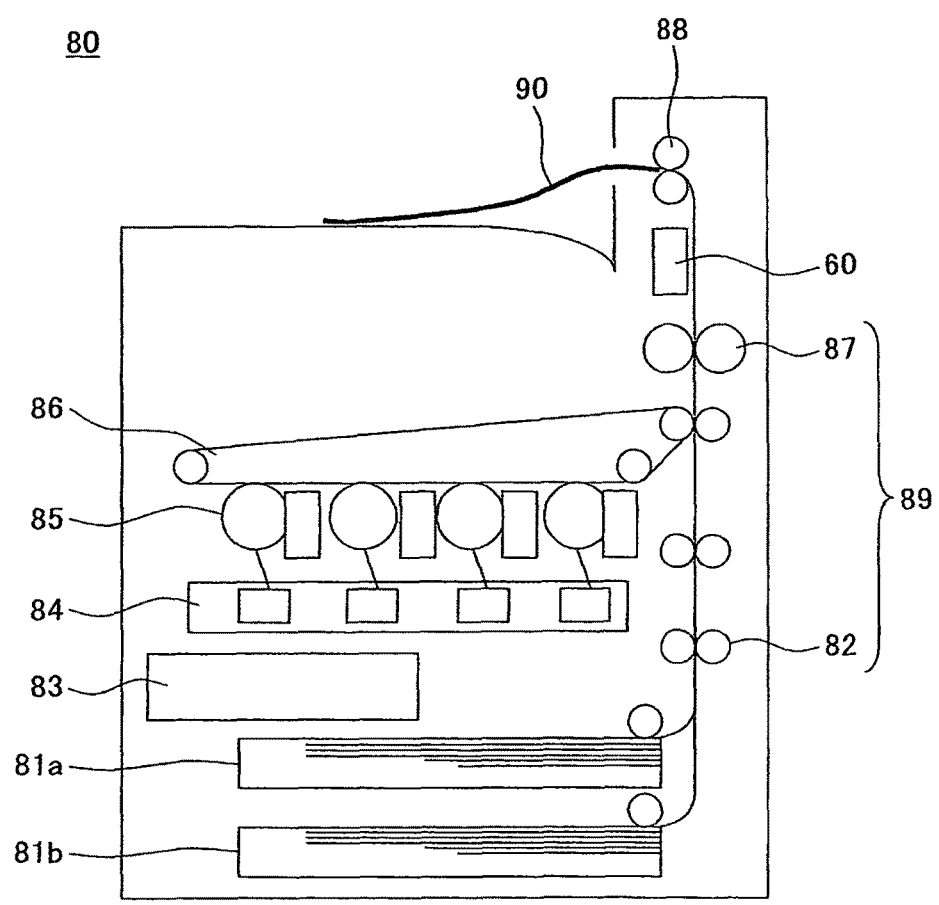
FIG. 36 is a diagram illustrating an eleventh embodiment of an image evaluation apparatus of the present invention.

An eleventh embodiment shows an example of an image forming apparatus that includes the image evaluation apparatus in the tenth embodiment. FIG. 36 is a diagram illustrating the image forming apparatus of the eleventh embodiment of the present invention. Referring to FIG. 36, the image forming apparatus 80 includes the image evaluation apparatus 60, a paper feeding cassette 81a, a paper feeding cassette 81b, a paper feeding roller 82, a controller 83, a scanning optical system 84, photoreceptors 85, a intermediate transcriptional body 86, fixing rollers 87, and paper ejection rollers 88. An image holding medium (e.g., paper) 90 is also shown in FIG. 36.

In the image forming apparatus 80, the image holding medium 90 is conveyed from the paper feeding cassettes 81a, 81b by a guide (which is not shown in FIG. 36) and the paper feeding rollers 82. The scanning optical system 84 exposes a photoreceptor 85, and a color material is applied to the photoreceptor 85 and is developed. The developed image is transferred to the intermediate transcriptional body 86 and then, transferred from the intermediate transcriptional body 86 to the image holding medium 90. The image transferred on the image holding medium 90 is fixed by the fixing rollers 87, and the image holding medium 90 on which the image is formed is ejected by the paper ejection rollers 87. The image evaluation apparatus 60 is installed at a latter part of the fixing rollers 87. Here the paper feeding rollers 82 and the fixing rollers 87 constitute a conveyance unit 89 to convey the image holding medium 90 to the image evaluation apparatus 60.

In addition, the controller 83 can function as a control unit to perform feedback correction when the spectral characteristic obtaining apparatus 10 to 50 working as a spectroscopic measurement unit in the image evaluation apparatus 60 detects a color variation.

In this manner, according to the eleventh embodiment, by installing the image evaluation apparatus of the tenth embodiment into a predetermined location, it is possible to provide a high-quality image without color variation across a whole image area. Also, since an automatic color calibration becomes possible, stably operating the image forming apparatus 80 becomes possible. In addition, because obtaining image information across a whole image area becomes possible, checking a product and storing print data become possible, which makes it possible to provide a reliable image forming apparatus.

As described above, a spectral characteristic obtaining apparatus, an image evaluation apparatus and an image forming apparatus of the present invention can read data at a high speed, and does not need an alignment of an observation position in plural wavelength bands when measuring a spectral characteristic of a reading object across the full width.

The present invention is not limited to the specifically disclosed embodiments, and variations and modifications may be made without departing from the scope of the present invention.

The present application is based on Japanese Priority Patent Application No. 2009-81986, filed on Mar. 30, 2009, and Japanese Priority Patent Application No. 2009-260259, filed on Nov. 13, 2009, the entire contents of which are incorporated herein by reference.

The invention claimed is:

1. A spectral characteristic obtaining apparatus comprising:
   a spectroscopic imaging unit configured to separate reflected light from light emitted onto an object by a light irradiation unit into a plurality of diffracted lights with different spectral characteristics; and
   a light receiving unit including a plurality of pixels configured to simultaneously receive the plurality of diffracted lights, wherein,
   each of the plurality of pixels of the light receiving unit receives one of the plurality of diffracted lights without receiving other ones of the plurality of diffracted lights and without receiving non-diffraction light, and
   the spectroscopic imaging unit includes a diffraction unit configured to lead the plurality of diffracted lights to one or more of the plurality of pixels, the diffraction unit being positioned such that a diffraction direction has an angle with respect to an array direction of the plurality of pixels in a plane perpendicular to a light axis of the light receiving unit, the angle is based on a size of the plurality of pixels and a number of the plurality of pixels.

2. The spectral characteristic obtaining apparatus as claimed in claim 1, wherein the light receiving unit is configured to be a spectroscopic sensor array including a plurality of spectroscopic sensors, a number of the plurality of pixels included in each of the plural spectroscopic sensors constituting the spectroscopic sensor array is set in accordance with an imaging characteristic in each position of the plural spectroscopic sensors.

3. The spectral characteristic obtaining apparatus as claimed in claim 1, wherein the light receiving unit is configured to be a spectroscopic sensor array including a plurality of spectroscopic sensors, a number of the plurality of pixels included in at least one of the plural spectroscopic sensors constituting the spectroscopic sensor array is set as a different number from a number of the plurality of pixels included in the other spectroscopic sensors.

4. The spectral characteristic obtaining apparatus as claimed in claim 1, further comprising:
   a first imaging unit configured to form an image onto the light receiving unit from an image on a pinhole array of the spectroscopic imaging unit; and
   a second imaging unit is provided between the reading object and the pinhole array.

5. The spectral characteristic obtaining apparatus as claimed in claim 1, further comprising:
   a light shielding unit provided between the spectroscopic imaging unit and the light receiving unit, the light shielding unit being configured to block the non-diffraction light.

6. The spectral characteristic obtaining apparatus as claimed in claim 1, wherein the angle is set based on a product of a height and a width of each of the plurality of pixels, and the number of plurality of pixels included in each spectroscopic sensor of the light receiving unit.

7. The spectral characteristic obtaining apparatus as claimed in claim 1, further comprising:
   a receiving unit configured to block a part of the light incident in a height direction of the plurality of pixels.

8. The spectral characteristic obtaining apparatus as claimed in claim 1, wherein a number of the one or more of the plurality of pixels is equal to or greater than six.

9. An Image evaluation apparatus configured to evaluate a color of an image formed on an image holding medium in plural colors, the image evaluation apparatus comprising:
   a spectral characteristic obtaining apparatus, the spectral characteristic obtaining apparatus including,
   a spectroscopic imaging unit configured to separate reflected light from light emitted onto an object by a light irradiation unit into a plurality of diffracted lights with different spectral characteristics, and
   a light receiving unit including a plurality of pixels configured to simultaneously receive the plurality of diffracted lights, wherein,
   each of the plurality of pixels of the light receiving unit receives one of the plurality of diffracted lights without receiving other ones of the plurality of diffracted lights and without receiving non-diffraction light, and the spectroscopic imaging unit includes a diffraction unit configured to lead the plurality of diffracted lights to one or more of the plurality of pixels, the diffraction unit being positioned such that a diffraction direction has an angle with respect to an array direction of the plurality of pixels in a plane perpendicular to a light axis of the light receiving unit, the angle is based on a size of the plurality of pixels and a number of the plurality of pixels;

a conveyance unit configured to convey the image holding medium; and an evaluation unit configured to evaluate a color of the image based on the different spectral characteristics obtained by the spectral characteristic obtaining apparatus.

10. An image forming apparatus including an image evaluation apparatus, the image evaluation apparatus comprising:

a spectral characteristic obtaining apparatus, the spectral characteristic apparatus including, a spectroscopic imaging unit configured to separate reflected light from light emitted onto an object by a light irradiation unit into a plurality of lights with different spectral characteristics, and a light receiving unit including a plurality of pixels configured to simultaneously receive the plurality of lights, wherein, each of the plurality of pixels of the light receiving unit receives one of the plurality of diffracted lights without receiving other ones of the plurality of diffracted lights and without receiving non-diffraction light, and the spectroscopic imaging unit includes a diffraction unit configured to lead the plurality of diffracted lights to one or more of the plurality of pixels, the diffraction unit being positioned such that a diffraction direction has an angle with respect to an array direction of the plurality of pixels in a plane perpendicular to a light axis of the light receiving unit, the angle is based on a size of the plurality of pixels and a number of the plurality of pixels;

a conveyance unit configured to convey the image holding medium;

an evaluation unit configured to evaluate a color of the image based on the spectral characteristic obtained by the spectral characteristic obtaining apparatus;

a photoreceptor configured to which a color material is applied and developed; and an intermediate transcriptional body configured to transfer the color material onto the image holding medium.

11. The image forming apparatus as claimed in claim 10, wherein the spectral characteristic obtaining apparatus is configured to measure a whole surface of a measurement object moving relative to the spectral characteristic obtaining apparatus; and the image forming apparatus further includes a control unit configured to perform feedback correction when the spectral characteristic obtaining apparatus detects a color variation across the whole surface.

\* \* \* \* \*